United States Patent
Zhou et al.

(10) Patent No.: US 8,971,278 B2
(45) Date of Patent: Mar. 3, 2015

(54) METHODS AND APPARATUSES FOR OPPORTUNISTIC ADVERTISING BEACON TRANSMISSION ON NON-SERVING WIRELESS CHANNELS

(71) Applicant: QUALCOMM Incorporated, San Diego, CA (US)

(72) Inventors: Yan Zhou, San Diego, CA (US); George Cherian, San Diego, CA (US); Hemanth Sampath, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 116 days.

(21) Appl. No.: 13/752,557

(22) Filed: Jan. 29, 2013

(65) Prior Publication Data

US 2014/0211699 A1 Jul. 31, 2014

(51) Int. Cl.
*H04W 4/00* (2009.01)
*H04W 24/02* (2009.01)

(52) U.S. Cl.
CPC .................................. *H04W 24/02* (2013.01)
USPC .......................................... 370/329; 455/450

(58) Field of Classification Search
CPC .............................. H04W 48/20; H04W 48/16
USPC ........... 370/329, 338, 331, 252, 311; 455/450
See application file for complete search history.

(56) References Cited

U.S. PATENT DOCUMENTS

| | | | |
|---|---|---|---|
| 8,126,403 B2 | 2/2012 | Wang Helmersson et al. | |
| 8,160,007 B2 | 4/2012 | Wu et al. | |
| 2006/0056367 A1* | 3/2006 | Marinier et al. | 370/338 |
| 2008/0205340 A1* | 8/2008 | Meylan et al. | 370/331 |
| 2008/0280621 A1* | 11/2008 | Soomro et al. | 455/450 |
| 2010/0265913 A1 | 10/2010 | Gorokhov et al. | |
| 2012/0057476 A1* | 3/2012 | Chan et al. | 370/252 |
| 2012/0135732 A1 | 5/2012 | Magadi Rangaiah et al. | |
| 2012/0238267 A1 | 9/2012 | Kim et al. | |
| 2014/0112229 A1* | 4/2014 | Merlin et al. | 370/311 |

\* cited by examiner

*Primary Examiner* — Albert T Chou
(74) *Attorney, Agent, or Firm* — Arent Fox LLP

(57) ABSTRACT

The present disclosure presents methods and apparatuses for improved wireless node transmission of advertising beacons based on, for example, the presence of sufficient wireless node resource availability and one or more user equipment (UE) wakeup schedules. For example, the present disclosure describes example methods of advertising beacon transmission by a wireless node, which may include determining that a resource availability opportunity exists for supporting a UE at the wireless node. In another aspect, methods may include tuning to a non-serving channel based on determining that the resource availability opportunity exists. According to such example methods, the non-serving channel may be different from a serving channel of the wireless node. Furthermore, the example methods may include transmitting an advertising beacon on the non-serving channel. Upon successful receipt of the advertising beacon, the UE may scan for the serving channel of the wireless node for subsequent wireless network access.

52 Claims, 14 Drawing Sheets

METHODS AND APPARATUSES FOR OPPORTUNISTIC ADVERTISING BEACON TRANSMISSION ON NON-SERVING WIRELESS CHANNELS

BACKGROUND

1. Field

Aspects of the present disclosure relate generally to wireless communication systems, and more particularly, to methods and apparatuses for improved wireless node beacon transmission.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications.

For example, currently, user equipment (UE) (e.g. mobile stations, mobile computers, phones, PDAs, laptops, etc.) operating in a Wi-Fi network typically will not scan other channels if the signal strength from the serving wireless node is above a predetermined threshold. Therefore, as long as the serving wireless node is above this threshold, the UE cannot find stronger wireless nodes on other channels. Some UEs attempt to solve this problem by periodically scanning all channels. Unfortunately, such periodic scanning interrupts ongoing traffic and wastes UE battery—especially when a large number of channels are scanned and no stronger wireless node exists.

In addition, some wireless nodes use a separate transmission chain to periodically send beacons across non-serving channels to aid UEs in wireless node discovery processes. However, this method requires an additional chain for the wireless node and causes interference to other channels by transmitting beacons even if the wireless node has no open resources to accept a new user, such as when the wireless node has either high channel load or little available backhaul.

Therefore, methods and apparatuses of improved advertising beacon transmission are needed to improve UE battery life, reduce interference and network load, and generally minimize the complexity associated with wireless node discovery.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents methods and apparatuses for providing improved wireless node transmission of advertising beacons based on, for example, the presence of sufficient wireless node resource availability and one or more UE wakeup schedules.

For example, the present disclosure describes example methods of advertising beacon transmission by a wireless node, which may include determining that a resource availability opportunity exists for supporting a UE at the wireless node. In another aspect, methods may include tuning to a non-serving channel based on determining that the resource availability opportunity exists. According to such example methods, the non-serving channel may be different from a serving channel of the wireless node. Furthermore, the example methods may include transmitting an advertising beacon on the non-serving channel.

In an additional aspect, the present disclosure describes an apparatus that may include means for determining that a resource availability opportunity exists for supporting a UE at a wireless node. The apparatus may further include means for tuning to a non-serving channel based on determining that the resource availability opportunity exists, and means for transmitting an advertising beacon on the non-serving channel.

Furthermore, the present description describes a computer-readable medium that may store machine-executable code for determining that a resource availability opportunity exists for supporting a UE at a wireless node. Additionally, the machine-executable code may include code for tuning to a non-serving channel based on determining that the resource availability opportunity exists and even code for transmitting an advertising beacon on the non-serving channel.

Moreover, the present disclosure introduces an apparatus for advertising beacon transmission. In some examples, the apparatus may include at least one processor and a memory coupled to the at least one processor. In some examples, the at least one processor may be configured to determine that a resource availability opportunity exists for supporting a UE at a wireless node and may also be configured to tune to a non-serving channel based on determining that the resource availability opportunity exists. In such an aspect, the non-serving channel may be different from a serving channel of the wireless node. Furthermore, the at least one processor may be configured to transmit an advertising beacon on the non-serving channel.

In another example, the present disclosure describes example methods of advertising beacon processing, which may include receiving, by a UE, an advertising beacon at a signal strength on a non-serving channel. In an aspect, the non-serving channel may be different from a serving channel. In another aspect, methods may include determining that the signal strength associated with the non-serving channel is greater than a signal strength associated with the serving channel by at least a threshold value, and scanning the non-serving channel.

In an additional aspect, the present disclosure describes an apparatus that may include means for receiving, by a UE, an advertising beacon at a signal strength on a non-serving channel. In an aspect, the non-serving channel may be different from a serving channel. The apparatus may further include means for determining that the signal strength associated with the non-serving channel is greater than a signal strength associated with the serving channel by at least a threshold value, and means for scanning the non-serving channel.

Furthermore, the present description describes a computer-readable medium that may store machine-executable code for receiving, by a UE, an advertising beacon at a signal strength on a non-serving channel. In an aspect, the non-serving channel may be different from a serving channel. Additionally, the machine-executable code may include code for determining that the signal strength associated with the non-serving channel is greater than a signal strength associated with the serving channel by at least a threshold value, and code for scanning the non-serving channel.

Moreover, the present disclosure introduces an apparatus for advertising beacon processing. In some examples, the apparatus may include at least one processor and a memory coupled to the at least one processor. In some examples, the at least one processor may be configured to receive, by a UE, an advertising beacon at a signal strength on a non-serving channel. In an aspect, the non-serving channel may be different from a serving channel. Furthermore, the at least one processor may be configured to determine that the signal strength associated with the non-serving channel is greater than a signal strength associated with the serving channel by at least a threshold value, and scan the non-serving channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
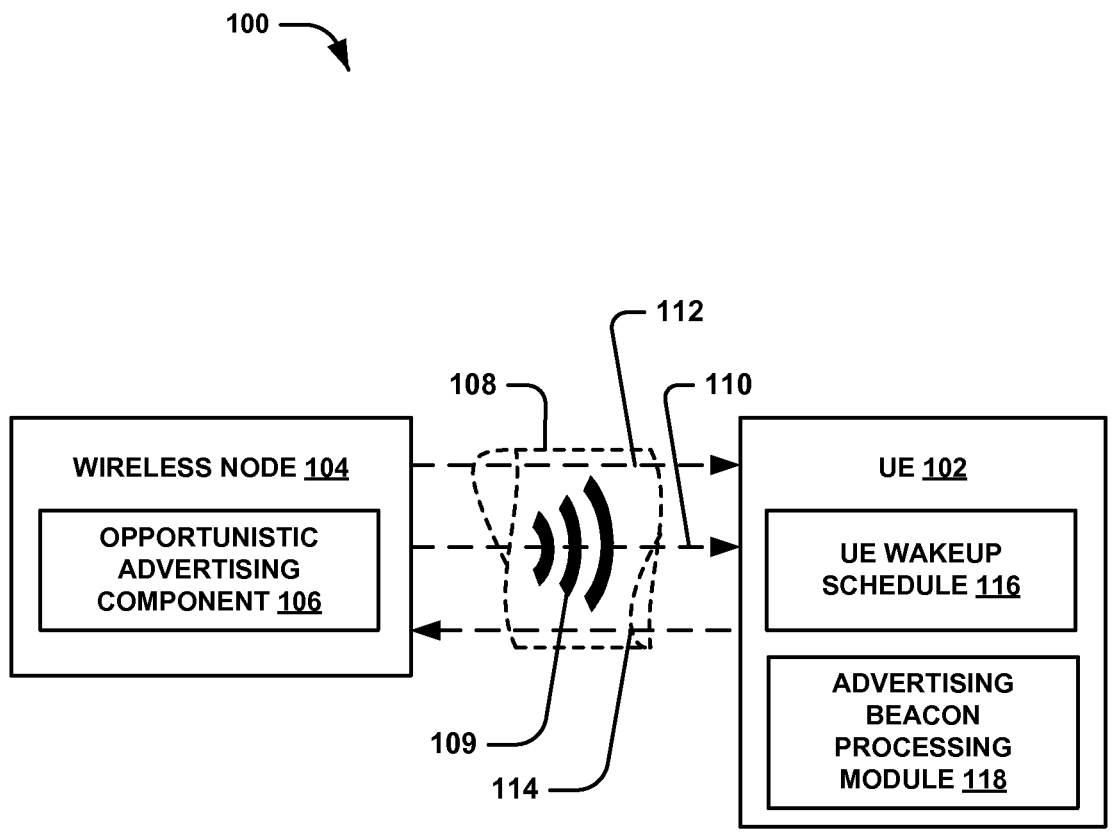
FIG. 1 is a block diagram illustrating an example wireless system of aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure teaches methods and apparatuses for improving the efficiency and effectiveness of wireless node advertisement in wireless network environments. For example, the present disclosure presents an opportunistic advertising beacon method where, under certain conditions, a wireless node may tune to one or more non-serving channels and transmit beacons containing information such the wireless node service set identifier (SSID) and/or serving channel number. According to an additional aspect, the advertising beacons can be transmitted where the serving channel of the wireless node has no current transmission traffic and where the wireless node has sufficient resources to accept a new UE. If a UE decodes such a beacon with a relatively better signal strength than its current serving cell, it may scan the channel indicated by the received beacon for improved service through the associated wireless node.

Furthermore, in an aspect of the present description, the UE may scan for a wireless node upon receiving an advertising beacon from the wireless node, and may do so regardless of the signal strength of the cell currently serving the UE. In addition, to help reduce battery consumption and traffic interruption, the UE may scan only upon detecting a strong advertising beacon from a wireless node and may scan only the channel indicated in the advertisement beacon.

In a further aspect of the present description, a wireless node may tune to a set of non-serving channels for sending advertising beacons where the traffic demand on the wireless node serving channel is low. This may occur, for example, when a channel load or traffic of a cell associated with the wireless node cell is below a threshold for a certain duration or when an available channel load exceeds a threshold for a certain duration. Alternatively or additionally, the wireless node may tune to the set of non-serving channels when the total buffered user data at the wireless node is below a threshold for a certain duration or when the available backhaul associated with an wireless node exceeds a threshold for a certain duration. In an additional aspect, the wireless node may tune away exclusively where a predetermined time interval since the last tune away has elapsed to prevent the wireless node tuning away too frequently and unnecessarily draining battery power.

In a further aspect, after tuning to each non-serving channel, the wireless node may transmit one or more advertising beacons in order that these beacons may be received by a UE on the non-serving channel during, for example, a periodic awake period of the UE. In some examples, the particular method for transmitting the one or more advertising beacons may depend on whether or not the wireless node contains information regarding the schedule of periodic awake periods of a UE. Thereafter, in an aspect, where a UE decodes a received advertising beacon having an associated signal strength of at least Y dB better than a current serving wireless node signal, it may scan the advertised channel, though such UE scanning decisions may additionally or alternatively depend on wireless node beacon-advertised information.

Referring to FIG. 1, a wireless communication system 100 that is configured to facilitate improved wireless node beacon advertising is illustrated. System 100 includes at least one UE 102 that may communicate wirelessly with one or more wireless nodes 104 via one or more channels 108, which may include, but are not limited to, serving channels and/or non-serving channels (e.g., frequency channels potentially available through the wireless node 104). Wireless node 104 may be configured to transmit one or more signals 109 to UE 102 over the one or more channels 108 including a serving channel, and one or more non-serving channels. In an aspect, signal 109 may include an advertising beacon 110 transmitted over at least one of the one or more non-serving channels.

In a further aspect, advertising beacon 110 may be received by UE 102 according to a known timing schedule and may contain a known information set. For example, this information set may include, but is not limited to including, an SSID, serving channel number, serving channel frequency, or other identifying or functional information associated with wireless node 104 that may be pertinent to communication between UE 102 and wireless node 104. Additionally, in some non-limiting aspects involving WiFi technology, a serving channel number and serving channel frequency may be the same or related. Nevertheless, any mention of serving channel frequency and/or serving channel number in a list is not an indication that a serving channel frequency is the same as, or is not the same as, a serving channel number.

Additionally, wireless node 104 may include an opportunistic advertising component 106, which may be configured to transmit the one or more advertising beacons 110 and may be further configured to optimize the scheduling of its advertising beacon transmissions opportunistically. For purposes of the present disclosure, "opportunistic," "opportunistically," and the like may refer to beacon signal transmission or related transmission scheduling that is based, at least in part, according to a wireless node wakeup schedule 116 of one or more UEs. In an aspect, each wireless node wakeup schedule 116 of each of one or more UEs 102 may include timing information related to the UE scanning for one or more beacon signals, including advertising beacon signals 110, associated with one or more wireless nodes 104.

In a further aspect, opportunistic advertising component 106 may be configured to tune from a serving channel to a non-serving channel for advertising signal transmission based on one or more network, cell, sector, or other wireless-node-related characteristics. For example, in some non-limiting aspects, opportunistic advertising component 106 may tune to such a non-serving channel exclusively upon determining that a resource availability opportunity for such tune away exists. In some examples, the opportunistic advertising component 106 may determine that such a resource availability opportunity exists based on comparing a traffic demand value, available backhaul value, and/or channel load value associated with the wireless node 104 to one or more corresponding thresholds, which may be dynamic or preconfigured. Additionally, such a resource availability opportunity may optionally be substantially concurrent to a tune away or may relate to a future or planned potential tune away time. By determining whether such a resource availability opportunity exists, a wireless node 104 can ensure that sufficient wireless node and/or wireless network processing or bandwidth resources exist in the event that an additional UE is added to a set of UEs served by the wireless node as a result of transmitting the advertising beacon 110.

UE 102 may include advertising beacon processing module 118. In an aspect, advertising beacon processing module 118 may include a non-serving channel threshold. In an aspect, the non-serving channel threshold may be a value, such as but not limited to, signal strength which may be used as a metric against which a non-serving channel advertising beacon transmission is compared. In such an aspect, advertising beacon processing module 118 may decide to scan the non-serving channel identified by the advertising beacon where the metric (e.g., signal strength, etc.) is greater than a comparable metric associated a serving channel by at least non-serving channel threshold.

Further, UE 102 may comprise a mobile apparatus and may be referred to as such throughout the present disclosure. Such a mobile apparatus or UE may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, the one or more wireless nodes 104 of system 100 may include one or more of any type of network component, such as an access point, including a base station (BS) or node B, a relay, a peer-to-peer device, an authentication, authorization and accounting (AAA) server, a mobile switching center (MSC), a radio network controller (RNC), etc. In a further aspect, the one or more wireless nodes 104 of system 100 may include one or more small base stations, such as, but not limited to a femtocell, picocell, microcell, or any other small base station.

Figure 2:
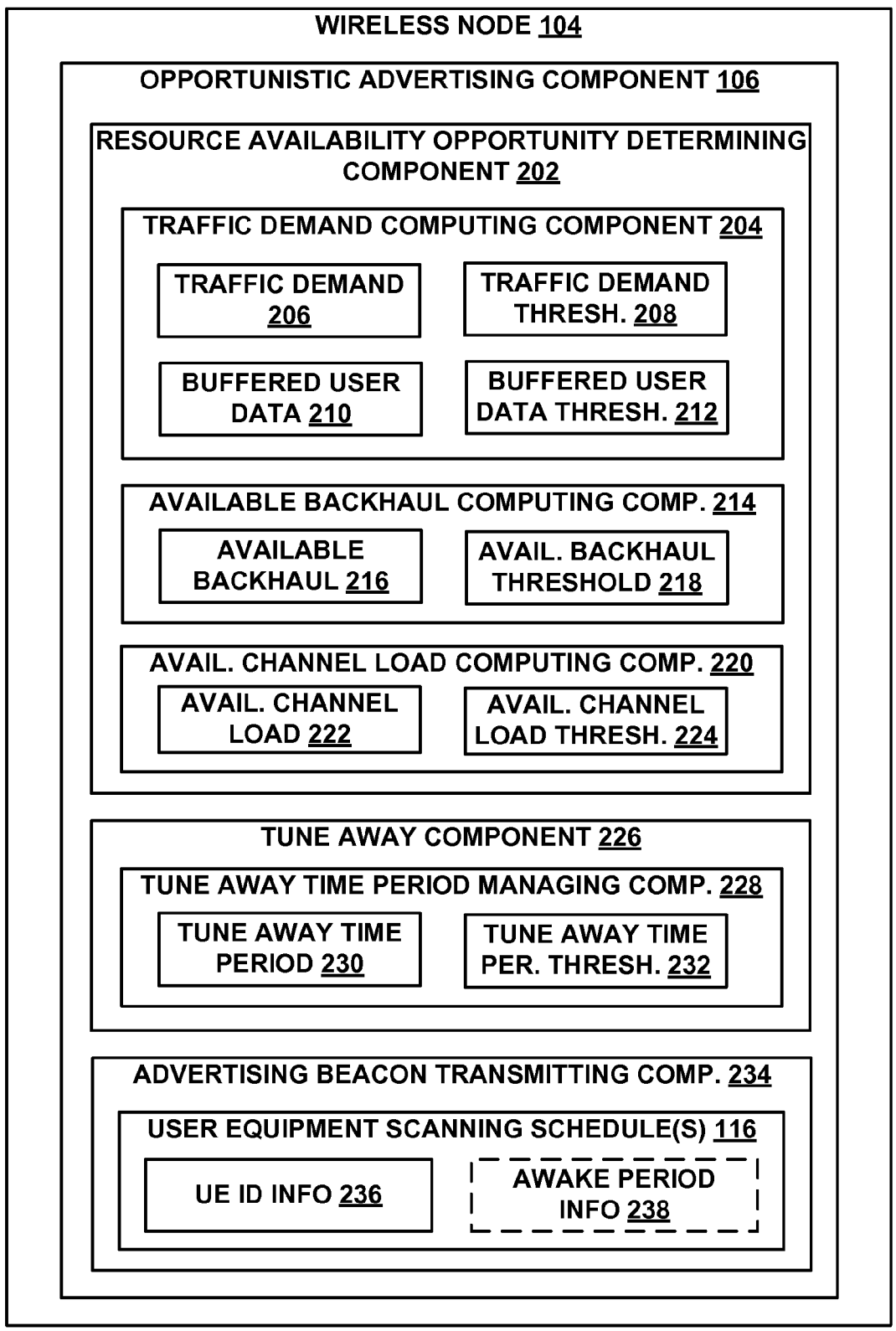
FIG. 2 is a block diagram illustrating a detailed example of a wireless node and its components in an example wireless communications system, according to aspects of the present disclosure.

FIG. 2 illustrates an example wireless node, which may correspond to wireless node 104 of FIG. 1, configured to perform opportunistic advertising beacon transmission. In an aspect, as introduced with reference to FIG. 1, wireless node 104 may include an opportunistic advertising component 106, which may be configured to tune from a serving channel to a non-serving channel and transmit one or more advertising signals. Also, in an aspect, this tune away and transmission may be based on characteristics or parameters corresponding to one or more of the wireless node 104, a network, cell, sector, or other wireless-node-related entity or characteristic. In an aspect, these one or more characteristics or parameters may include, but are not limited to, buffered user data 210 stored at wireless node 104, available backhaul 216 of a backhaul link between wireless node 104 and one or more other network entities, an available channel load of a serving channel of the wireless node 104, and/or a tune away time period 230 that has elapsed since a last tune away.

In an aspect, these one or more characteristics or parameters may be utilized by resource availability opportunity determining component 202, which may be included in opportunistic advertising component 106, to determine whether a resource availability opportunity exists for such tune away and/or advertising beacon transmission. For example, resource availability opportunity determining component 202 may include a traffic demand computing component 204, which may be configured to determine whether the traffic demand 206 of the wireless node is below a traffic demand threshold 208, which may be dynamic, static, and/or preconfigured. In some non-limiting examples, traffic demand 206 may be a function of a current amount of buffered user data 210 at the wireless node 104, which may be stored in one or buffers or other memory components waiting future queuing and/or transmission to one or more UEs 102. In an aspect, traffic demand computing component 204 may be configured to compare traffic demand 206 to traffic demand threshold 208 and determine that a resource availability opportunity exists where the traffic demand 206 is below, or in some aspects, less than or equal to, traffic demand threshold 208. Likewise, in some aspects, traffic demand computing component 204 may be configured to compare buffered user data 210 to a buffered user data threshold 212 and determine that a resource availability opportunity exists where the buffered data threshold 212 is below, or in some aspects, less than or equal to, traffic demand threshold 208. In an aspect, buffered user data threshold 212, which may be dynamic, static, and/or preconfigured.

In an additional aspect, resource availability opportunity determining component 202 may include an available backhaul computing component 214, which may be configured to determine whether an available backhaul 216 is greater than or equal to an available backhaul threshold 218. For example, where available backhaul computing component 214 determines that available backhaul 216 is greater than or equal to an available backhaul threshold 218, it may determine that a resource availability opportunity exists for immediate or subsequent tune away to a non-serving channel and/or transmission of an advertising beacon. In addition, available backhaul 216 may be defined as or computed according to the difference between a maximum allowable backhaul traffic capacity and a current or predicted backhaul traffic. In an aspect, available backhaul 216 may represent a communication link between the wireless node 104 and one or more other network entities, such as, but not limited to, another wireless node 104, a radio network controller (RNC), a mobility management entity (MME), a security gateway, or any other network component, and/or may represent an IuB, Iu-5, Iu-h, S1-u, S1-MME, X2, or any other specification-defined (or -undefined) network link.

Furthermore, resource availability opportunity determining component 202 may include an available channel load computing component 220, which may be configured to determine whether an available channel load 222 is greater than or equal to an available channel load threshold 224. In an aspect, the available channel load 222 may represent a current serving channel data load. Alternatively or additionally, the available channel load 222 may represent a future or predicted serving channel data load. In another aspect, available channel load 222 may be related to historic channel load amounts and/or a current or historical amount of buffered user data 210. In addition, available channel load 222 may be defined as or computed according to the difference between a maximum allowable channel load and a current or predicted total load. In an aspect, where available channel load computing component 220 determines that available channel load 222 is greater than or equal to an available channel load threshold 218, it may determine that a resource availability opportunity exists for substantially immediate or subsequent tune away to a non-serving channel and/or transmission of an advertising beacon.

In addition, according to some examples, opportunistic advertising component 106 may include a tune away component 226, which may be configured to tune away from a serving channel to a non-serving channel of the wireless node 104. In an aspect, tune away component 226 may perform such tune away where resource availability opportunity determining component 202 determines that a resource availability opportunity exists for tune away and potential advertising beacon transmission. Furthermore, tune away component 226 may be configured to initiate a timer and/or otherwise maintain a tune away time period 230, which may correspond to a time period since the completion of the last wireless node tune away from the serving channel to a non-serving channel for advertising beacon transmission. In an aspect, tune away time period managing component 228 may be further configured to determine whether the tune away time period 230 is less than, greater than, or equal to a tune away time period threshold 232. According to some examples, tune away component 226 may be configured to tune away to a non-serving channel exclusively where the current value of tune away time period 230 is greater than or equal to tune away time period threshold 232. In a further aspect, tune away time period threshold 232 may be static (e.g. preconfigured) or dynamic, and may be dependent upon one or more measured network or wireless node parameters.

Additionally, opportunistic advertising component 106 may include an advertising beacon transmitting component, which may be configured to generate and/or transmit one or more advertising beacons (e.g. advertising beacon 110 of FIG. 1). In an aspect, advertising beacon transmitting component 234 may be configured to transmit one or more advertising beacons for a transmit time period such that the beacon is received by a UE during at least one UE awake period associated with the particular UE. In an aspect, UE identification information 236 may include an Internet Protocol (IP) address, Unique Device Identifier (UDID), Android™ ID, International Mobile Equipment Identity (IMEI), International Mobile Subscriber Identity (IMSI), or any other unique identifier. Alternatively or additionally, UE identification information 236 may include a serving cell identifier, serving channel frequency or carrier, tune away period start time stamp and frequency information, or any other information that may not be unique to the particular UE but may be utilized for purposes of advertising beacon transmit time period calibration at the wireless node 104. Such information may optionally comprise awake period information 238, though this information may be stored separately or optionally may be unknown to the wireless node 104, as indicated by the dashed line of the block representing awake period information 238.

In some examples, where the wireless node is not informed regarding the periodic awake periods of a UE (e.g. has no stored UE-specific awake period information 238), the advertising beacon transmitting component 234 may be configured to transmit a sequence of advertising beacons with sufficient duration and density on the non-serving channel such that one or more transmitted advertising beacons are received by the UE in at least one UE awake period. As used herein, the advertising beacon "duration" may refer to the total duration of the beacon sequence, and the advertising beacon "density" may refer to an interval between beacon transmission. In some examples, the time duration for receiving a full advertising beacon at each UE may be less than a typical UE awake period. In one such non-limiting example, a UE awake period may be a 10 ms window every 100 ms, and an advertising beacon transmission duration may be 1 ms. According to this example, the advertising beacon transmitting component 234 may be configured to send a sequence of advertising beacons on a non-serving channel with a beacon interval (e.g., 13 ms) and total sequence duration (e.g., 110 ms) such that at least one advertising beacon transmission may fall into at least one UE wakeup period, even if the advertising AP is unaware of the UE wakeup schedule. In other words, in this non-limiting example, though the precise awake period information 238 for each UE may not be known, each UE may receive at least one advertising beacon during its awake period. As illustrated by the above example, the time duration of an advertising beacon transmitted by advertising beacon transmitting component 234 may be less than the awake period duration of UEs served by the wireless node. Additionally or alternatively, the time duration of an advertising beacon may be larger than the duration of a UE awake period.

Additionally, where the wireless node is informed regarding the periodic awake period information 238 of a UE, advertising beacon transmitting component 234 may transmit a sequence of advertising beacons during the next known UE awake period. In such non-limiting examples, a wireless node may estimate the start times of the periodic awake periods of a UE by, for example, requesting UEs served by the wireless node to report any observed beacon timestamps associated with one or more wireless node channels. In an additional or alternative aspect, wireless node 104 (e.g. through tune away component 226) may tune to other channels or frequencies and may record beacon timestamps associated with any observed advertising beacons transmitted from other wireless nodes. In another aspect, the wireless node may obtain the UE wakeup schedule for a non-serving channel through prompting a served UE to tune to a non-serving channel used by a neighboring AP. The served UE may then determine a beacon transmission time schedule of the neighboring AP by listening to its beacons. Further, the served UE may tune back to the serving channel and report to the advertising AP information associated with the beacon transmission schedule of the neighboring AP. As the neighboring AP and the advertising AP may be synchronized, the advertising AP may use the beacon transmission time schedule as the UE wakeup time schedule on that non-serving channel. Additionally or in the alternative, an advertising AP itself can learn the beacon transmission schedule of neighboring AP on a non-serving channel by tuning to each non-serving channel. Furthermore, where a wireless node determines that that a UE is constantly awake, the wireless node may simply transmit a sequence of advertising beacons at any time.

Figure 3:
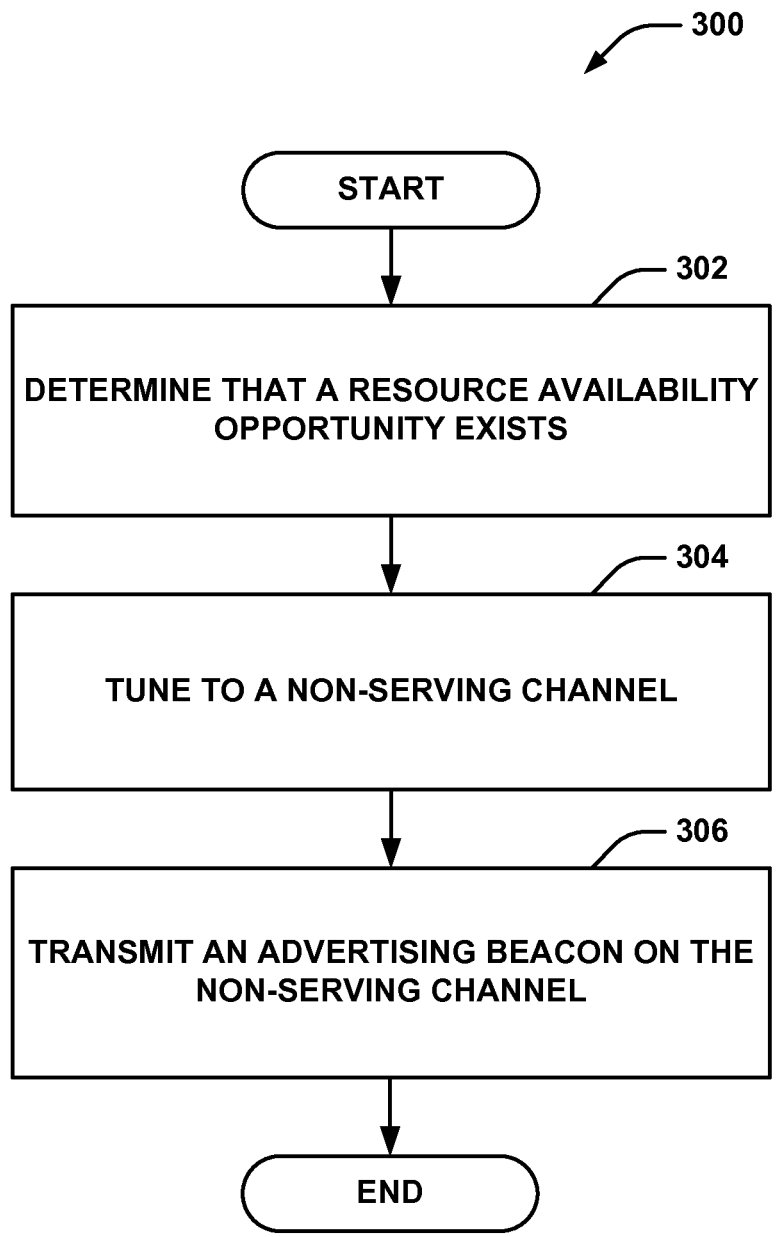
FIG. 3 is a flow diagram illustrating aspects of a method for opportunistic advertisement message transmission, according to aspects of the present disclosure.
Figure 4:
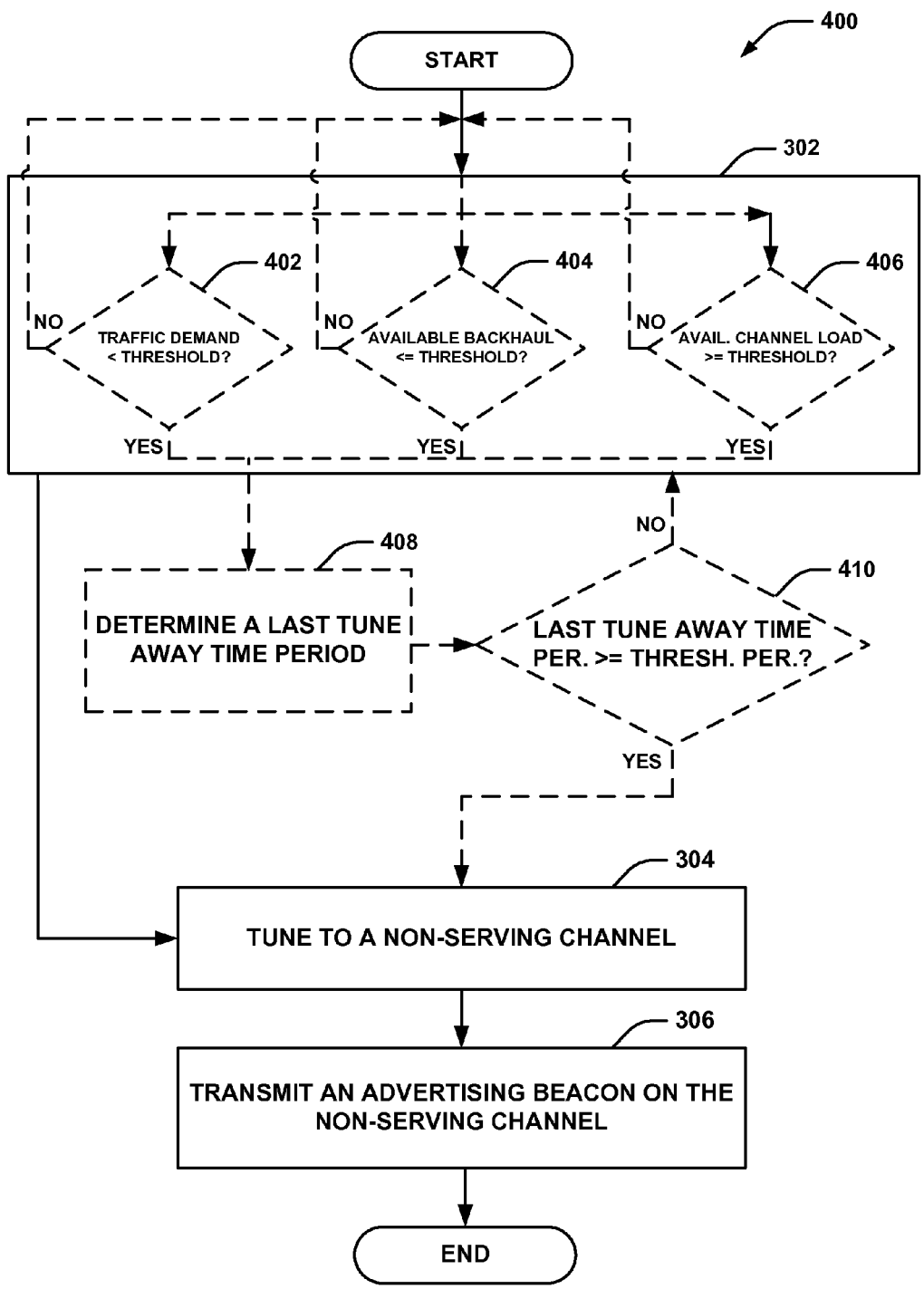
FIG. 4 is a flow diagram illustrating additional or alternative aspects of a method for opportunistic advertisement message transmission, according to aspects of the present disclosure.
Figure 8:
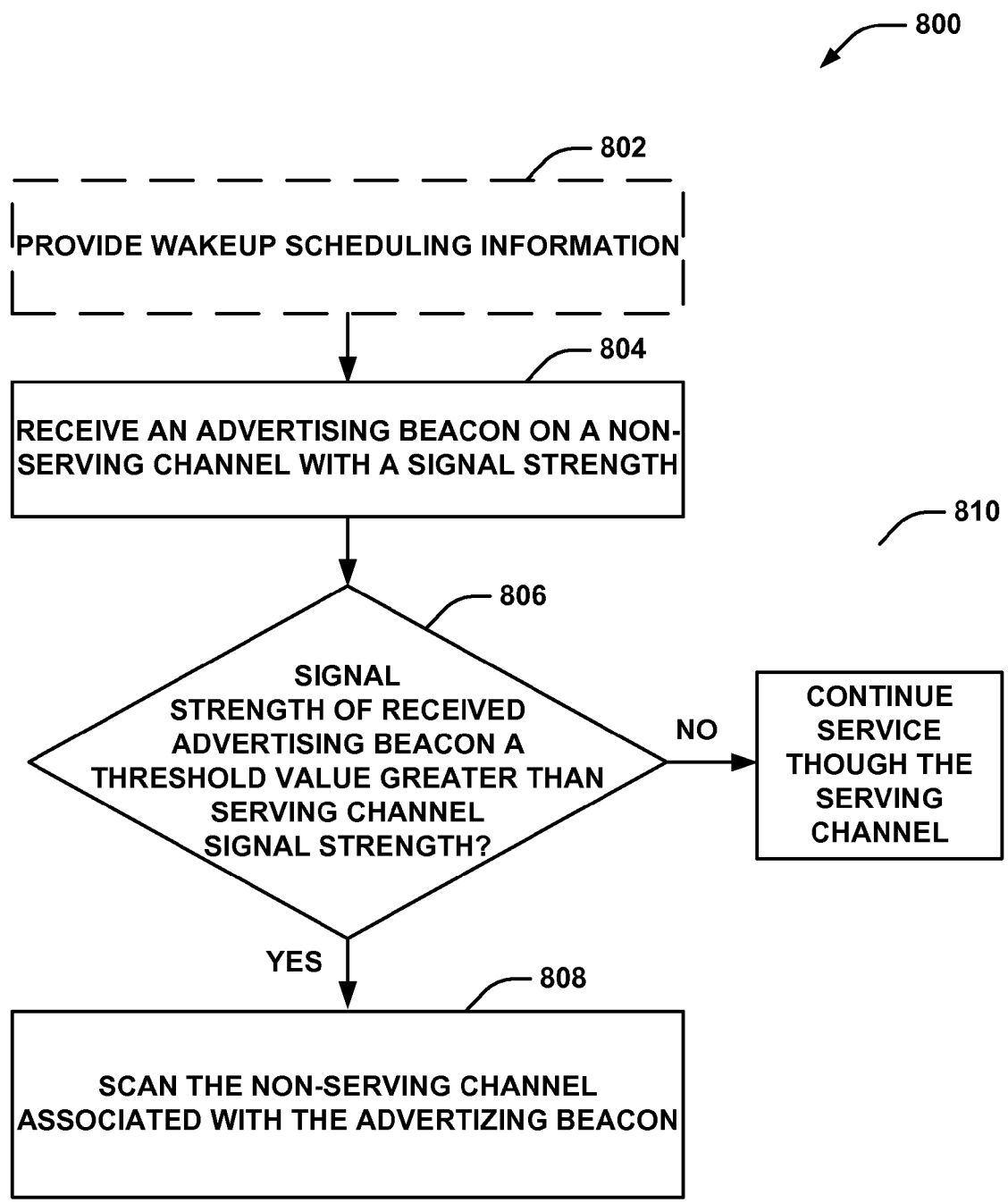
FIG. 8 is a flow diagram illustrating aspects of a method for opportunistic advertisement message processing, according to aspects of the present disclosure.

FIGS. 3, 4, and 8 illustrate various methodologies in accordance with various aspects of the presented subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 3 illustrates an example methodology 300 for improved and opportunistic advertising beacon transmission according to aspects of the present disclosure. In an aspect, a wireless node may determine that a resource availability opportunity at the wireless node exists, for example, for supporting a UE at block 302. In an aspect, the determining may be based at least on one or more characteristics or parameters associated with a wireless node, such as, but not limited to, an available channel load, a traffic demand, an amount of buffered user data, an amount of buffered user data, and/or any other characteristics or parameters of the wireless node, a served UE or UEs, a network, or the like that may have an impact on wireless node performance were one or more UEs to be served by the wireless node.

In addition, at block 304, methodology 300 may include a wireless node, for example, tuning to a non-serving channel in response to determining the resource availability opportunity exists. In an aspect, this non-serving channel may be different (e.g. associated with a different frequency or carrier) from a serving channel of the wireless node. In an additional aspect, the wireless node may tune away at block 304, for example, exclusively where a predetermined time interval since the last tune away has elapsed to prevent the wireless node tuning away too frequently and unnecessarily draining battery power in the case of a battery-powered wireless node. Furthermore, at block 306, a wireless node may transmit an advertising beacon on the non-serving channel. In some examples, this advertising beacon may include information that may allow a UE that receives the advertising beacon to attempt to form a communicative connection with the wireless node, which may include, but is not limited to, a serving channel frequency and/or number, connection credentials, wireless node SSIID, etc. Additionally, the wireless node may transmit the advertising beacon to one or more UEs based on UE-specific wakeup schedule information that may have been provided wirelessly by the individual UEs and stored at the wireless node.

FIG. 4 illustrates an example methodology 400, which may be based on and may supplement aspects of methodology 300 of FIG. 3. In an aspect of methodology 400, block 302 of example methodology 300 of FIG. 3, determining that a resource availability opportunity exists, may contain one or more optional decision sub-blocks—namely, optional blocks 402, 404, and 406. The optional nature of these sub-blocks is indicated in FIG. 4 by the dashed lines constituting the individual blocks and associated flow pointers. For example, at block 402, to determine that a resource availability opportunity exists, the wireless node may determine whether traffic demand is below, or in some examples, below or equal to, a traffic demand threshold. Furthermore, at block 404, the wireless node may determine whether an available backhaul (e.g. current or future available backhaul link capacity or backhaul link data transit time) is less than or equal to an available backhaul threshold. Additionally or alternatively, in some examples, at block 406, the wireless node may determine whether an available channel load (e.g. current or future serving channel data transmission or data receiving volume, etc.) is greater than or equal to an available channel load threshold.

Furthermore, the methodology steps of blocks 402, 404, and 406, or any subsets thereof, may be performed in series and/or in parallel. For example, as indicated in the parallel arrangement of optional blocks 402, 404, and 406 of FIG. 4, any one, two, or all methodology steps optionally performed in each of these blocks may be performed in parallel. In other words, in examples of parallel methodology step performance (e.g. as illustrated in FIG. 4), where the wireless node determines that the traffic demand is below the traffic demand threshold (block 402), the available backhaul is greater than or equal to the available backhaul threshold (block 404), OR the available channel load is greater than or equal to the available channel load threshold (block 406), the wireless node may determine that a resource availability opportunity exists, thereby exiting block 302, and continue the methodology 400 at block 408. In such a purely parallel example, only where all of the inequalities of blocks 402, 404, or 406 are false will methodology 400 exit block 302 to repeat the one or more sub-blocks.

In other examples (not shown) two or more of blocks 402, 404, and 406 may be arranged serially. For instance, in a non-limiting example where each of these blocks are arranged serially (e.g. in series or in direct sequence), the wireless node may determine that a resource availability opportunity exists only where the wireless node determines that the traffic demand is below the traffic demand threshold (block 402), the available backhaul is greater than or equal to the available backhaul threshold (block 404), AND the available channel load is greater than or equal to the available channel load threshold (block 406). In other words, in such a purely serial arrangement, each of the inequalities of blocks 402, 404, and 406 must be determined to be true for the wireless node process to exit block 302 and continue the methodology 400 at block 408. Stated differently, in this non-limiting purely serial example, where one or more of the inequalities of blocks 402, 404, or 406 is false, methodology 400 may exit block 302 to repeat the one or more sub-blocks. Furthermore, blocks 402, 404, and 406 must not be performed in a purely serial or purely parallel fashion. Instead, in some examples (not shown), two of these blocks may be performed in series, while the remaining block is performed in parallel to the two serial blocks. Additionally, the wireless node need not perform each of the method steps of blocks 402, 404, and 406. Instead, only a subset comprising only one or two of these steps may be required in some examples, and where such a subset contains any two of these steps, those steps may likewise be performed in serial or parallel.

In an additional aspect, in some examples, before moving directly on to tuning to a non-serving channel (block 304), the wireless node may perform one or more optional steps. For example, in such examples, upon determining that a resource availability opportunity exists at block 302, the wireless node may determine, at optional block 408, a last tune away time period, which may be defined as the period of time since the last wireless node transmission tune away from the serving channel to a non-serving channel. Furthermore, at block 410, the wireless node may optionally determine, at block 410, whether the last tune away time period is greater than a last tune away time period threshold. In an aspect, where the last tune away time period is less than the last tune away time period threshold, the wireless node may return to block 302. Alternatively, where the last tune away time period is greater than the last tune away time period threshold, the wireless node may move to performing tune away to the non-serving channel at block 304, and may transmit an advertising beacon on the non-serving channel at block 306.

Figure 5:
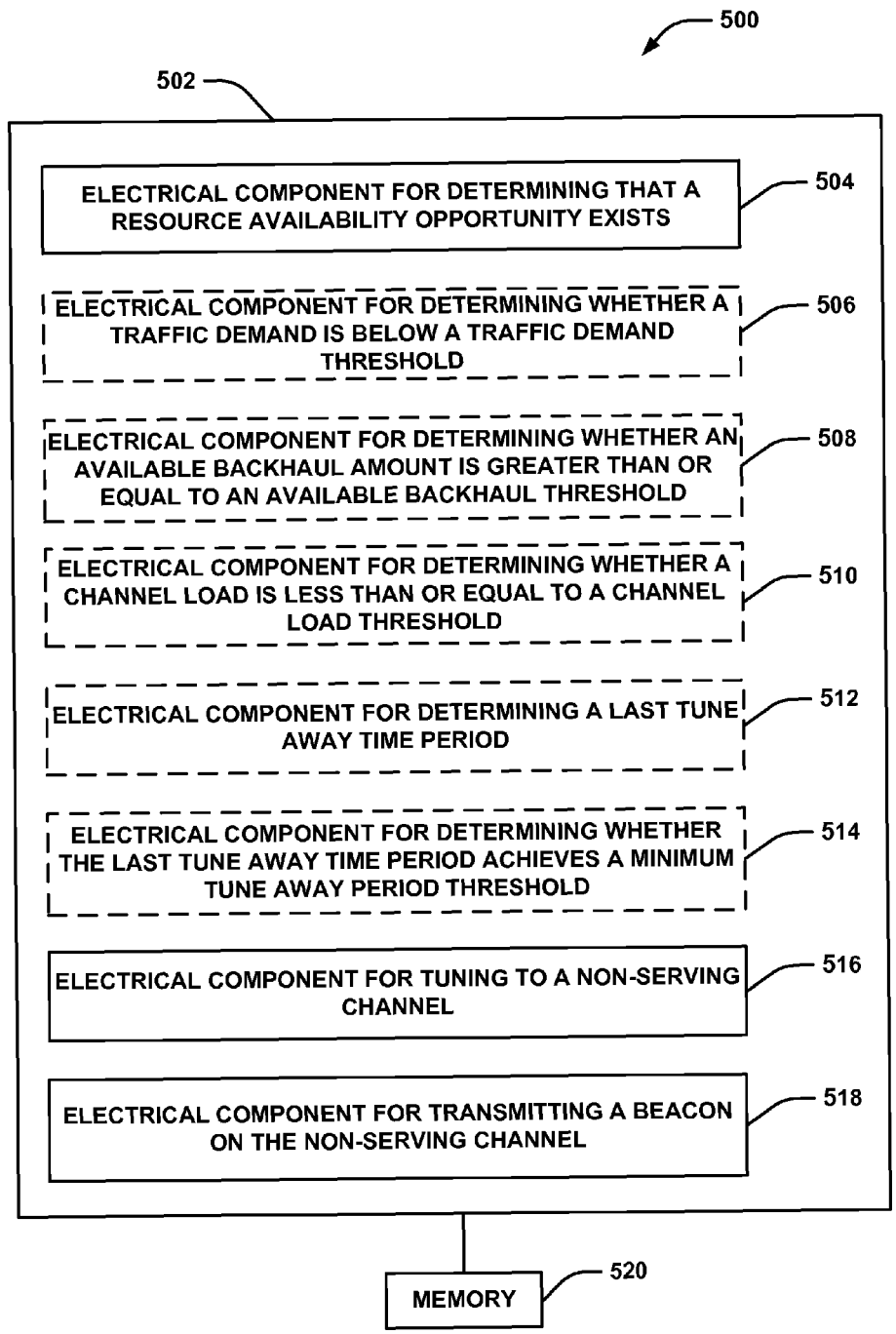
FIG. 5 is a component diagram illustrating aspects of a logical grouping of electrical components as contemplated by the present disclosure.

Referring to FIG. 5, an example system 500 is displayed for improved and opportunistic advertising beacon transmission. For example, system 500 can reside at least partially within wireless node 104 of FIGS. 1 and 2. It is to be appreciated that system 500 is represented as including functional blocks, which can be functional blocks that represent functions implemented by a processor, software, or combination thereof (e.g., firmware).

Example system 500 includes a logical grouping 502 of electrical components that can act in conjunction. For instance, logical grouping 502 can include an electrical component 504 for determining that a resource availability opportunity exists. In an aspect, electrical component 504 may comprise resource availability opportunity determining component 202 (FIG. 2). Additionally, logical grouping 502 can include an optional electrical component 506 for determining whether a traffic demand is below a traffic demand threshold. In an aspect, electrical component 506 may comprise traffic demand computing component 204 (FIG. 2). In an additional aspect, logical grouping 502 can include an optional electrical component 508 for determining whether an available backhaul amount is greater than or equal to an available backhaul threshold. In an aspect, electrical component 508 may comprise available backhaul computing component 214 (FIG. 2). Furthermore, logical grouping 502 can include an optional electrical component 510 for determining whether a channel load is less than or equal to a channel load threshold. In an aspect, for example, available channel load computing component 220 (FIG. 2) can implement electrical component 510. Furthermore, logical grouping 502 can include an optional electrical component 512 for determining a last tune away time period. In an aspect, tune away time period managing component 228 (FIG. 2) can implement electrical component 512. Furthermore, logical grouping 502 can include an optional electrical component 514 for determining whether the last tune away time period achieves a minimum tune away time period threshold. In an aspect, electrical component 514 may comprise tune away time period managing component 228 (FIG. 2). Additionally, logical grouping 502 can include an electrical component 516 for tuning to a non-serving channel. In an aspect, electrical component 516 may comprise tune away component 226 (FIG. 2). Moreover, logical grouping 502 can include an electrical component 518 for transmitting an advertising beacon on a non-serving channel. In an aspect, electrical component 518 may comprise advertising beacon transmitting component 234 (FIG. 2) or communications component 306 (FIG. 3). Thus, electrical components 504, 506, 508, 510, 512, 514, 516, and 518 may correspond to one or more components in FIGS. 1 and 2, and such components may be separate physical components, components implemented by a processor, or a combination thereof.

Additionally, system 500 can include a memory 520 that retains instructions for executing functions associated with the electrical components 504, 506, 508, 510, 512, 514, 516, and 518, stores data used or obtained by the electrical components 504, 506, 508, 510, 512, 514, 516, and 518, etc. While shown as being external to memory 520, it is to be understood that one or more of the electrical components 504, 506, 508, 510, 512, 514, 516, and 518 can exist within memory 520. In one example, electrical components 504, 506, 508, 510, 512, 514, 516, and 518 can comprise at least one processor, or each electrical component 504, 506, 508, 510, 512, 514, 516, and 518 can be a corresponding module of at least one processor. Moreover, in an additional or alternative example, electrical components 504, 506, 508, 510, 512, 514, 516, and 518 can be a computer program product including a computer readable medium, where each electrical component 504, 506, 508, 510, 512, 514, 516, and 518 can be corresponding code.

Figure 6:
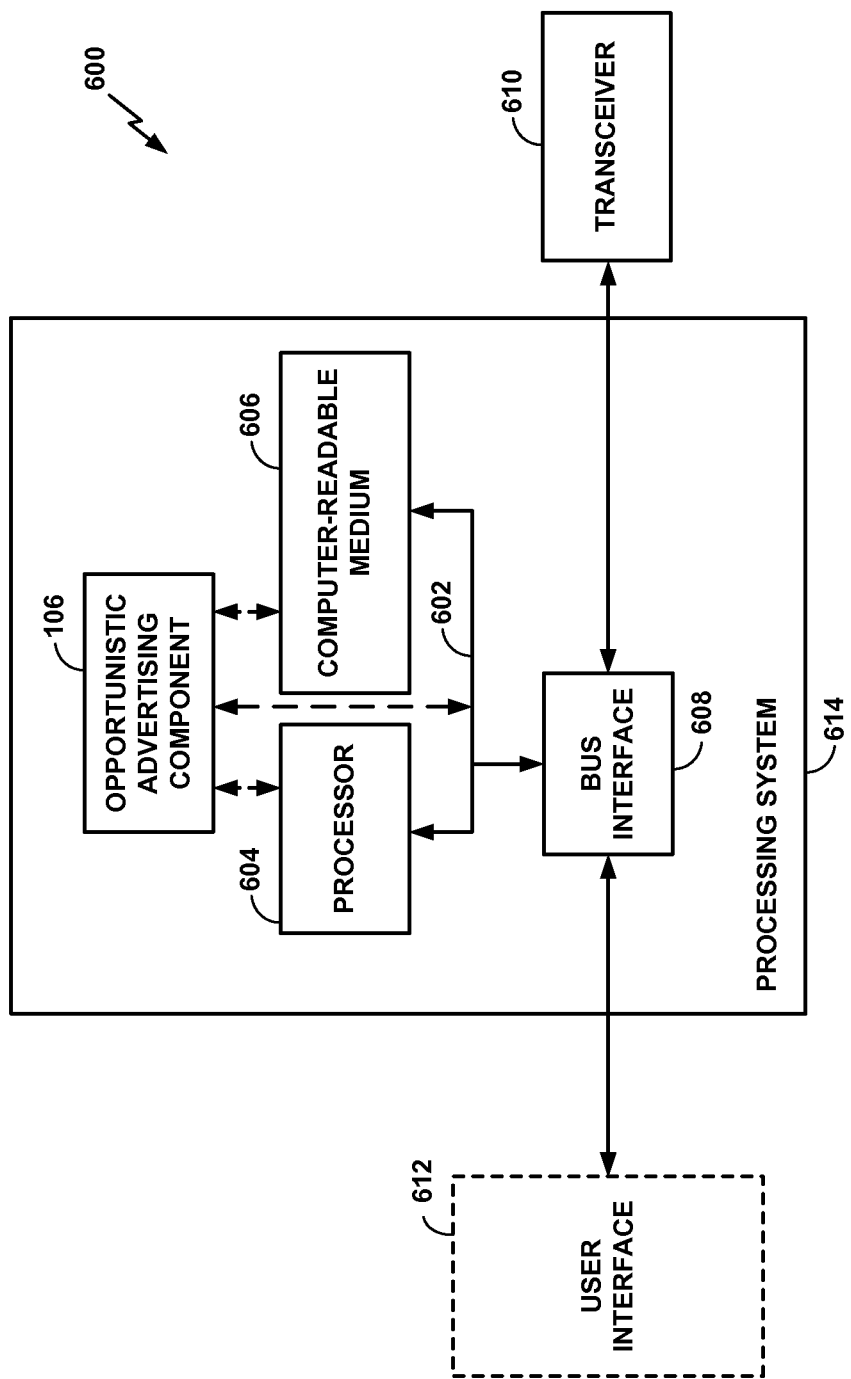
FIG. 6 is a block diagram illustrating an example of a hardware implementation for an apparatus employing a processing system.

FIG. 6 is a block diagram illustrating an example of a hardware implementation for an apparatus 600 employing a processing system 614 for carrying out improved advertising beacon transmission and tune away, such as for implementing opportunistic advertising component 106 (FIGS. 1 and 2). In this example, the processing system 614 may be implemented with a bus architecture, represented generally by a bus 602. The bus 602 may include any number of interconnecting buses and bridges depending on the specific application of the processing system 614 and the overall design constraints. The bus 602 links together various circuits including one or more processors, represented generally by the processor 604, computer-readable media, represented generally by the computer-readable storage medium 606, and one or more components described herein, such as, but not limited to, opportunistic advertising component 106 (FIGS. 1 and 2). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable storage medium 606. The software, when executed by the processor 604, causes the processing system 614 to perform the various functions described infra for any particular apparatus. The computer-readable storage medium 606 may also be used for storing data that is manipulated by the processor 604 when executing software. Thus, opportunistic advertising component 106 may be a separate physical component, or a component implemented by processor 604 or stored in computer-readable storage medium 606, or a combination thereof.

Figure 7:
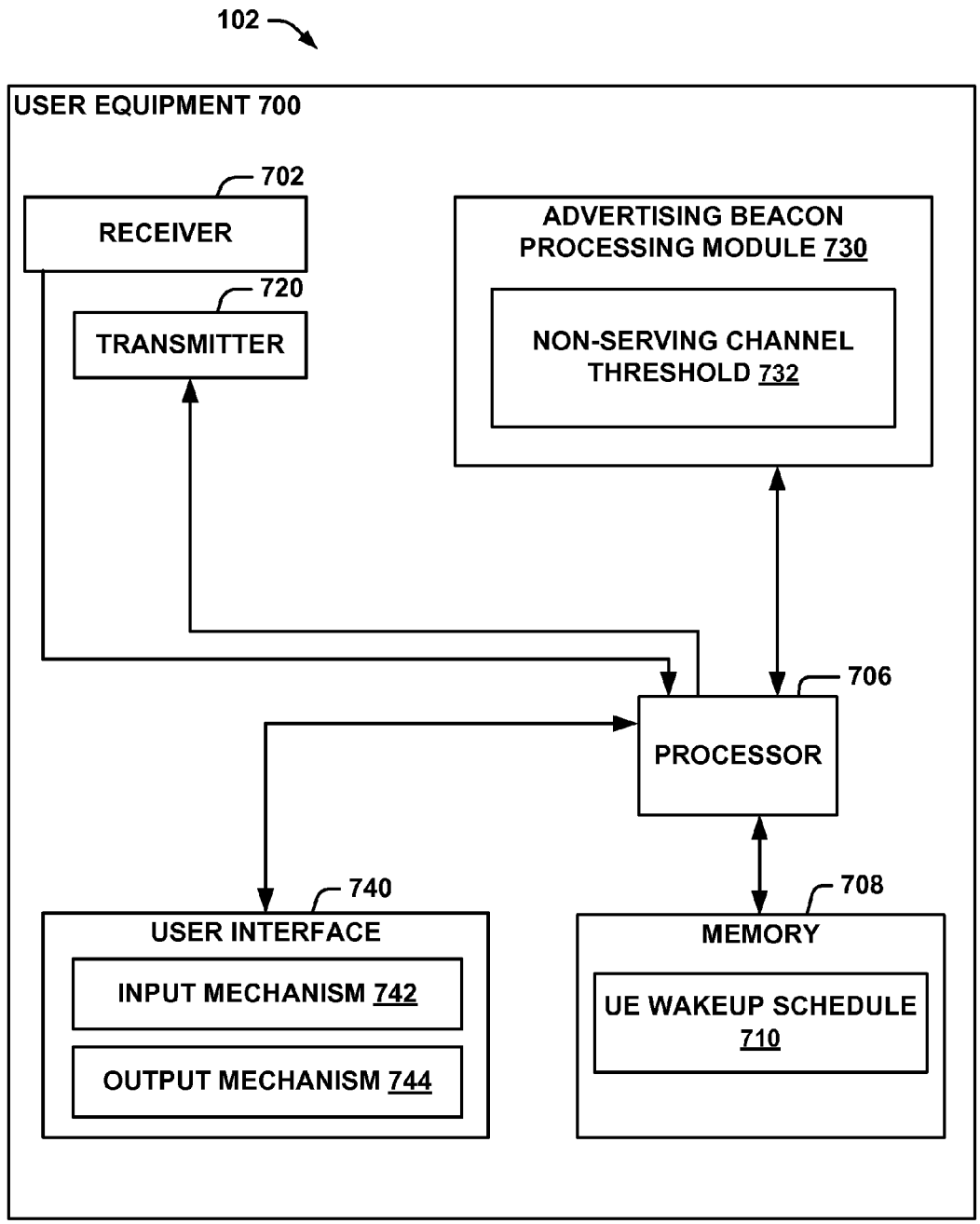
FIG. 7 is a block diagram of an example user equipment for providing for opportunistic advertisement message process, according to aspects of the present disclosure.

FIG. 7 depicts a block diagram of an example user equipment (UE) 700 (e.g., UE 102) for processing opportunistic advertising beacons, according to an aspect. UE 700 comprises receiver 702 that receives one or more signals from, for instance, one or more receive antennas (not shown), performs typical actions on (e.g., filters, amplifies, downconverts, etc.) the received signals, and digitizes the conditioned signals to obtain samples. Receiver 702 can further comprise an oscillator that can provide a carrier frequency for demodulation of the received signal and a demodulator that can demodulate received symbols and provide them to processor 706 for channel estimation. In one aspect, UE 700 may further comprise one or more secondary receivers and may receive additional channels.

Processor 706 can be a processor dedicated to analyzing information received by receiver 702 and/or generating information for transmission by one or more transmitters 720 (for ease of illustration, one transmitter is shown), a processor that controls one or more components of UE 700, and/or a processor that both analyzes information received by receiver 702, generates information for transmission by transmitter 720 for transmission on one or more transmitting antennas (not shown), and controls one or more components of UE 700.

In one aspect, processor 706 and/or advertising beacon processing module 730 may provide means for receiving, by the UE 700, advertising beacon at a signal strength on a non-serving channel. In an aspect, the non-serving channel may be a different channel than a serving channel. In another aspect, processor 706 and/or advertising beacon processing module 730 may provide means for determining that the signal strength associated with the non-serving channel is greater than a signal strength associated with the serving channel by at least a threshold value, and means for scanning the non-serving channel.

UE 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.). In one aspect, memory 708 may include a UICC which may include various modules such as but not limited to, a subscriber information module (SIM), a CDMA Subscriber Identity Module (CSIM), etc.

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 708 of the subject systems and methods is intended to comprise, without being limited to, these and any other suitable types of memory.

UE 700 may further include advertising beacon processing module 730. In an aspect, advertising beacon processing module 730 may include a non-serving channel threshold 732. In an aspect, the non-serving channel threshold 732 may be a value, such as but not limited to, signal strength which may be used as a metric against which a non-serving channel advertising beacon transmission is compared. In such an aspect, advertising beacon processing module 730 may decide to scan the non-serving channel identified by the advertising beacon where the metric (e.g., signal strength, etc.) is greater than a comparable metric associated a serving channel by at least non-serving channel threshold 732. In another aspect, advertising beacon processing module 730 may be configured to scan the advertised channel upon a determination that a decoded advertising beacon with signal strength at least non-serving channel threshold 732 better than current serving AP. In an aspect, advertising beacon processing module 730 may be configured to receive a message from a serving wireless node that prompts UE 700 to tune to a non-serving channel used by a neighboring AP. The advertising beacon processing module 730 may then determine a beacon transmission time schedule of the neighboring AP by listening to its beacons. Further, the advertising beacon processing module 730 may tune back to the serving channel and report to the advertising wireless node (e.g., the node from which the message was received) information associated with the beacon transmission schedule of the neighboring AP. In an aspect, advertising beacon processing module 730 may be configured to provide a wakeup schedule 710 to allow a non-serving wireless node to communicate an advertising beacon to the UE 700 at a time when the UE 700 may receive such information. In such an aspect, the UE 700 may also may request and/or receive UE identification information from a set of UEs through peer-to-peer communications.

Operation of advertising beacon processing module 730 is depicted in the flowchart of FIG. 8.

Additionally, UE 700 may include user interface 740. User interface 740 may include input mechanisms 742 for generating inputs into UE 700, and output mechanism 744 for generating information for consumption by the user of UE 700. For example, input mechanisms 742 may include a mechanism such as a key or keyboard, a mouse, a touch-screen display, a microphone, etc. Further, for example, output mechanism 744 may include a display, an audio speaker, a haptic feedback mechanism, a Personal Area Network (PAN) transceiver, etc. In one aspect, output mechanism 744 may include a display operable to present content that is in image or video format or an audio speaker to present content that is in an audio format.

FIG. 8 illustrates an example methodology 800 for improved and opportunistic advertising beacon processing according to aspects of the present disclosure.

In an optional aspect, a UE may provide wakeup scheduling information to a wireless node at block 802. In as aspect, the UE may be prompted by the wireless node to tune to a non-serving channel used by a neighboring AP, determine a beacon transmission time schedule of the neighboring AP by listening to its beacons, and the tune back to the serving channel and report to the advertising wireless node (e.g., the node from which the message was received) information associated with the beacon transmission schedule of the neighboring AP.

At block 804, the UE may receive an advertising beacon on a non-serving channel. In an aspect, the various metrics, such as but limited to signal strength, associated with the beacon reception may be measured by the UE. In some examples, this advertising beacon may include information that may allow the UE to attempt to form a communicative connection with the advertising wireless node. Such information may include but is not limited to, a serving channel frequency and/or number, connection credentials, wireless node SSIID, etc.

At block 806, the UE may determine whether the signal strength (and/or some other measured metric) of the received advertising beacon is a threshold value greater than serving channel signal strength (and/or corresponding metric value).

If at block 806, the UE determines that the signal strength (and/or some other measured metric) of the received advertising beacon is the threshold value greater than serving channel signal strength (and/or corresponding metric value), then at block 808, the UE may scan the non-serving channel associated with the advertising beacon.

By contrast, if at the block 808, the UE determines that the signal strength (and/or some other measured metric) of the received advertising beacon is not the threshold value greater than serving channel signal strength (and/or corresponding metric value), then at block 808, the UE may continue service through the serving channel. In an aspect, the UE may not scan other channels unless an advertising beacon with sufficiently high signal strength is received. In such an aspect, the UE may reduce battery consumption and traffic interruption.

Figure 9:
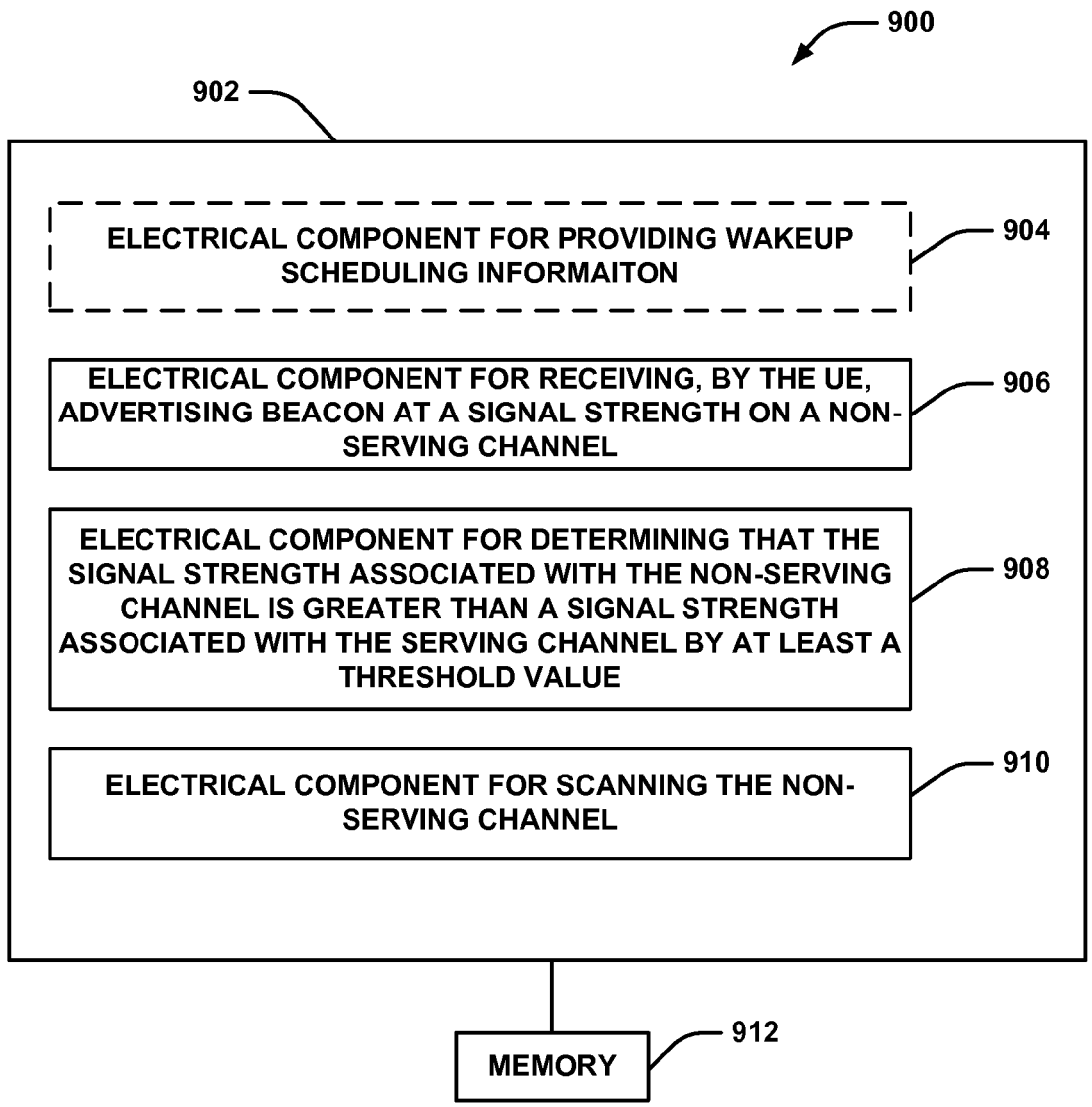
FIG. 9 is another component diagram illustrating aspects of a logical grouping of electrical components as contemplated by the present disclosure.

Referring to FIG. 9, an example system 900 is displayed for improved and opportunistic advertising beacon processing. For example, system 900 can reside at least partially within UE 102 of FIGS. 1 and 7. It is to be appreciated that system 900 is represented as including functional blocks, which can be functional blocks that represent functions implemented by a processor, software, or combination thereof (e.g., firmware). For example, system 900 may be implemented via processor 706, memory 708, receiver 702, transmitter 720, etc. of FIG. 7, by for example, processor 706 executing software stored by data store (e.g. memory 708).

Example system 900 includes a logical grouping 902 of electrical components that can act in conjunction. For instance, logical grouping 902 can include an electrical component 904 for providing wakeup scheduling information to a wireless node. In an aspect, electrical component 904 may comprise advertising beacon processing module 730, processor 706, memory 708, receiver 702, and/or transmitter 720 (FIG. 7). In as aspect, the UE may be prompted by the wireless node to tune to a non-serving channel used by a neighboring AP, determine a beacon transmission time schedule of the neighboring AP by listening to its beacons, and the tune back to the serving channel and report to the advertising wireless node (e.g., the node from which the message was received) information associated with the beacon transmission schedule of the neighboring AP.

Additionally, logical grouping 902 can include an optional electrical component 906 for receiving an advertising beacon on a non-serving channel. In an aspect, electrical component 906 may comprise receiver 702 (FIG. 7). In an aspect, the various metrics, such as but limited to signal strength, associated with the beacon reception may be measured by the UE. In some examples, this advertising beacon may include information that may allow the UE to attempt to form a communicative connection with the advertising wireless node. Such information may include but is not limited to, a serving channel frequency and/or number, connection credentials, wireless node SSIID, etc.

In an additional aspect, logical grouping 902 can include an optional electrical component 908 for determining whether the signal strength (and/or some other measured metric) of the received advertising beacon is a threshold value greater than serving channel signal strength (and/or corresponding metric value). In an aspect, electrical component 908 may comprise advertising beacon processing module 730, processor 706, and/or memory 708 (FIG. 7).

Furthermore, logical grouping 902 can include an optional electrical component 910 for scanning the non-serving channel. In an aspect, for example, processor 706, memory 708, and/or transmitter 720 (FIG. 7) can implement electrical component 910. Thus, electrical components 904, 906, 908, and 910 may correspond to one or more components in FIGS. 1 and 7, and such components may be separate physical components, components implemented by processor 706, or a combination thereof.

Additionally, system 900 can include a memory 912 that retains instructions for executing functions associated with the electrical components 904, 906, 908, and 910, stores data used or obtained by the electrical components 904, 906, 908, and 910, etc. While shown as being external to memory 912, it is to be understood that one or more of the electrical components 904, 906, 908, and 910 can exist within memory 912. In one example, electrical components 904, 906, 908, and 910 can comprise at least one processor, or each electrical component 904, 906, 908, and 910 can be a corresponding module of at least one processor. Moreover, in an additional or alternative example, electrical components 904, 906, 908, and 910 can be a computer program product including a computer readable medium, where each electrical component 904, 906, 908, and 910 can be corresponding code.

Figure 10:
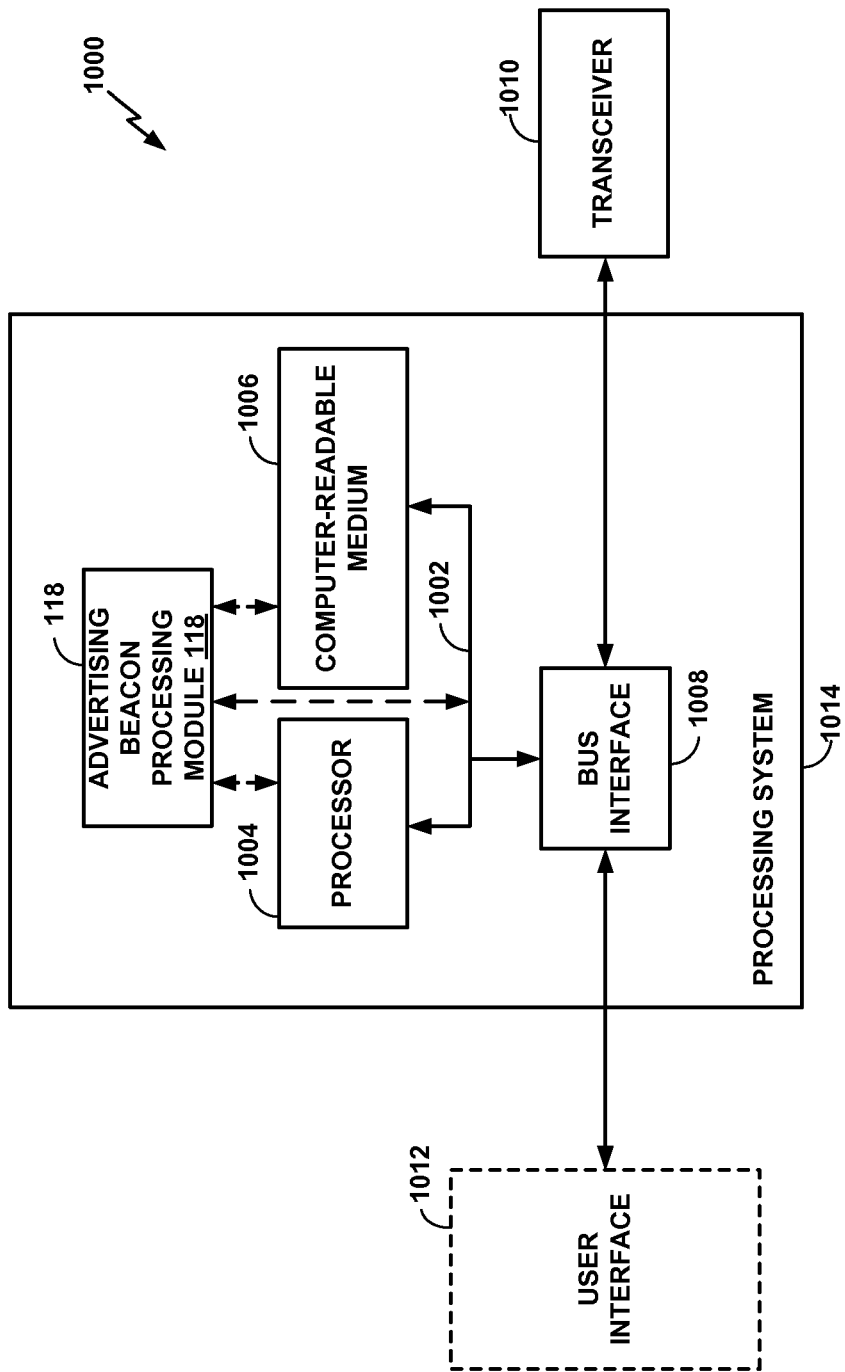
FIG. 10 is a block diagram illustrating an example of a hardware implementation for an apparatus employing a processing system.

FIG. 10 is a block diagram illustrating an example of a hardware implementation for an apparatus 1000 employing a processing system 1014 for carrying out improved advertising beacon transmission and tune away, such as for implementing opportunistic advertising processing module 118 (FIGS. 1 and 7). In this example, the processing system 1014 may be implemented with a bus architecture, represented generally by a bus 1002. The bus 1002 may include any number of interconnecting buses and bridges depending on the specific application of the processing system 1014 and the overall design constraints. The bus 1002 links together various circuits including one or more processors, represented generally by the processor 1004, computer-readable media, represented generally by the computer-readable storage medium 1006, and one or more components described herein, such as, but not limited to, opportunistic advertising processing module 118 (FIGS. 1 and 7). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium. Depending upon the nature of the apparatus, a user interface 1012 (e.g., keypad, display, speaker, microphone, joystick) may also be provided.

The processor 1004 is responsible for managing the bus 1002 and general processing, including the execution of software stored on the computer-readable storage medium 1006. The software, when executed by the processor 1004, causes the processing system 1014 to perform the various functions described infra for any particular apparatus. The computer-readable storage medium 1006 may also be used for storing data that is manipulated by the processor 1004 when executing software. Thus, advertising processing module 118 (FIGS. 1 and 7) may be a separate physical component, or a component implemented by processor 1004 or stored in computer-readable storage medium 1006, or a combination thereof.

Figure 11:
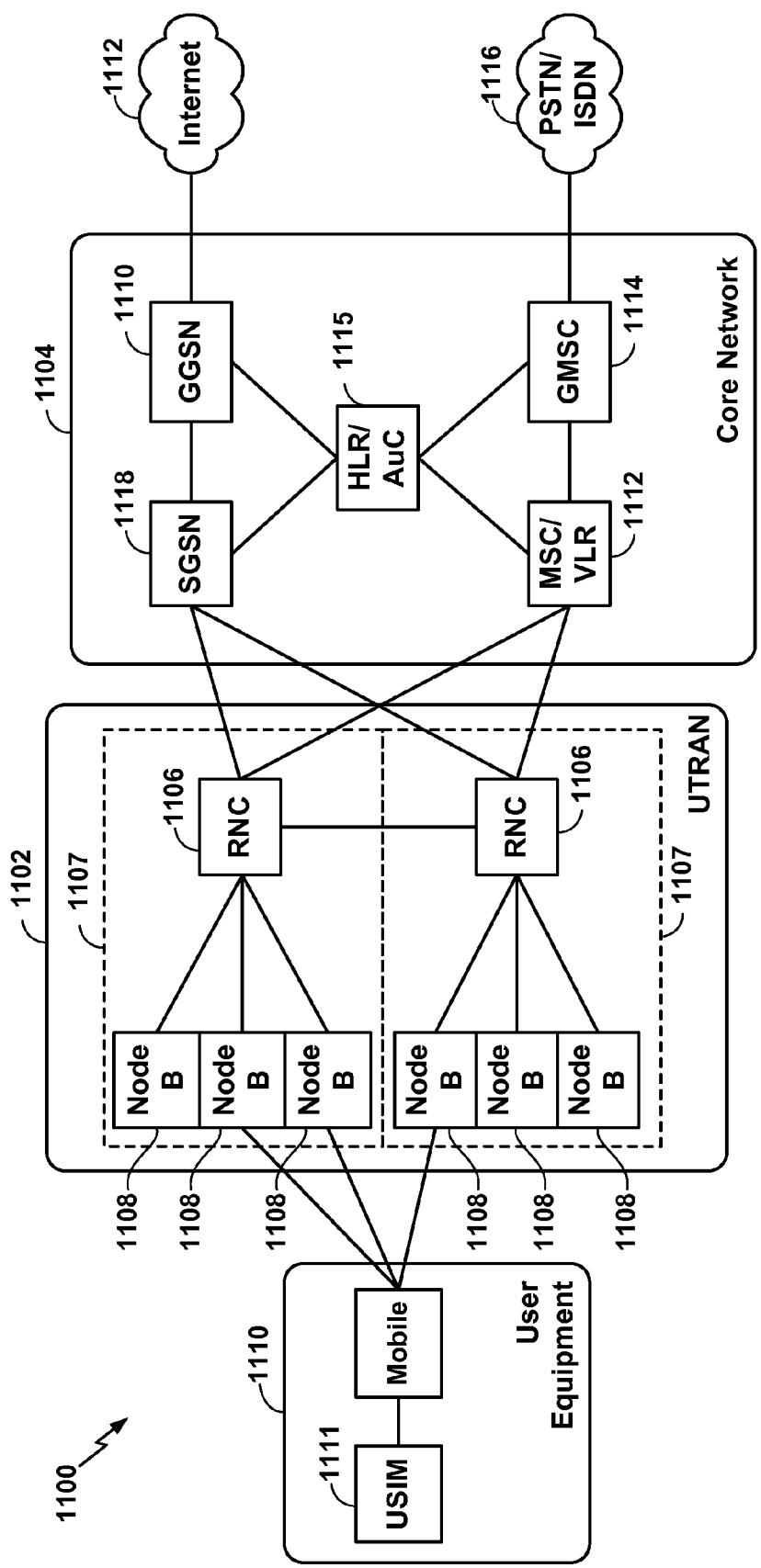
FIG. 11 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 11 are presented with reference to a UMTS system 1100 employing a WCDMA air interface. A UMTS network includes three interacting domains: a Core Network (CN) 1104, a UMTS Terrestrial Radio Access Network (UTRAN) 1102, and User Equipment (UE) 1110. In an aspect, UE 1110 may be UE 102 (FIG. 1) and may be configured to perform data-signal-based CIR estimation and signal optimization according to the aspects of the present disclosure. In this example, the UTRAN 1102 provides various wireless services including telephony, video, data, messaging, broadcasts, and/or other services. The UTRAN 1102 may include a plurality of Radio Network Subsystems (RNSs) such as an RNS 1107, each controlled by a respective Radio Network Controller (RNC) such as an RNC 1106. Here, the UTRAN 1102 may include any number of RNCs 1106 and RNSs 1107 in addition to the RNCs 1106 and RNSs 1107 illustrated herein. The RNC 1106 is an apparatus responsible for, among other things, assigning, reconfiguring, and releasing radio resources within the RNS 1107. The RNC 1106 may be interconnected to other RNCs (not shown) in the UTRAN 1102 through various types of interfaces such as a direct physical connection, a virtual network, or the like, using any suitable transport network.

Communication between a UE 1110 and a NodeB 1108, which may optionally represent wireless node 104 of FIGS. 1 and 2, may be considered as including a physical (PHY) layer and a medium access control (MAC) layer. Further, communication between a UE 1110 and an RNC 1106 by way of a respective NodeB 1108 may be considered as including a radio resource control (RRC) layer. In the instant specification, the PHY layer may be considered layer 1; the MAC layer may be considered layer 6; and the RRC layer may be considered layer 3. Information herein below utilizes terminology introduced in the RRC Protocol Specification, 3GPP TS 65.331 v9.1.0, incorporated herein by reference.

The geographic region covered by the RNS 1107 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 1108 are shown in each RNS 1107; however, the RNSs 1107 may include any number of wireless Node Bs. The Node Bs 1108 provide wireless access points to a CN 1104 for any number of mobile apparatuses, and may be the wireless node of FIGS. 1-3. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 1110 may further include a universal subscriber identity module (USIM) 1111, which contains a user's subscription information to a network. For illustrative purposes, one UE 1110 is shown in communication with a number of the Node Bs 1108. The DL, also called the forward link, refers to the communication link from a NodeB 1108 to a UE 1110, and the UL, also called the reverse link, refers to the communication link from a UE 1110 to a NodeB 1108.

The CN 1104 interfaces with one or more access networks, such as the UTRAN 1102. As shown, the CN 1104 is a GSM core network. However, as those skilled in the art will recognize, the various concepts presented throughout this disclosure may be implemented in a RAN, or other suitable access network, to provide UEs with access to types of CNs other than GSM networks.

The CN 1104 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 1104 supports circuit-switched services with a MSC 1112 and a GMSC 1114. In some applications, the GMSC 1114 may be referred to as a media gateway (MGW). One or more RNCs, such as the RNC 1106, may be connected to the MSC 1112. The MSC 1112 is an apparatus that controls call setup, call routing, and UE mobility functions. The MSC 1112 also includes a VLR that contains subscriber-related information for the duration that a UE is in the coverage area of the MSC 1112. The GMSC 1114 provides a gateway through the MSC 1112 for the UE to access a circuit-switched network 1116. The GMSC 1114 includes a home location register (HLR) 1115 containing subscriber data, such as the data reflecting the details of the services to which a particular user has subscribed. The HLR is also associated with an authentication center (AuC) that contains subscriber-specific authentication data. When a call is received for a particular UE, the GMSC 1114 queries the HLR 1115 to determine the UE's location and forwards the call to the particular MSC serving that location.

The CN 1104 also supports packet-data services with a serving GPRS support node (SGSN) 1118 and a gateway GPRS support node (GGSN) 1120. GPRS, which stands for General Packet Radio Service, is designed to provide packet-data services at speeds higher than those available with standard circuit-switched data services. The GGSN 1120 provides a connection for the UTRAN 1102 to a packet-based network 1122. The packet-based network 1122 may be the Internet, a private data network, or some other suitable packet-based network. The primary function of the GGSN 1120 is to provide the UEs 1110 with packet-based network connectivity. Data packets may be transferred between the GGSN 1120 and the UEs 1110 through the SGSN 1118, which performs primarily the same functions in the packet-based domain as the MSC 1112 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" WCDMA air interface for UMTS is based on such direct sequence spread spectrum technology and additionally calls for a frequency division duplexing (FDD). FDD uses a different carrier frequency for the UL and DL between a NodeB 1108 and a UE 1110. Another air interface for UMTS that utilizes DS-CDMA, and uses time division duplexing (TDD), is the TD-SCDMA air interface. Those skilled in the art will recognize that although various examples described herein may refer to a WCDMA air interface, the underlying principles may be equally applicable to a TD-SCDMA air interface.

An HSPA air interface includes a series of enhancements to the 3G/WCDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its data channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 1110 provides feedback to the node B 1108 over the HS-DPCCH to indicate whether it correctly decoded a packet on the downlink.

HS-DPCCH further includes feedback signaling from the UE 1110 to assist the node B 1108 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 1108 and/or the UE 1110 may have multiple antennas supporting MIMO technology. The use of MIMO technology enables the node B 1108 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 1110 to increase the data rate or to multiple UEs 1110 to increase the overall system capacity. This is achieved by spatially precoding each data stream and then transmitting each spatially precoded stream through a different transmit antenna on the downlink. The spatially precoded data streams arrive at the UE(s) 1110 with different spatial signatures, which enables each of the UE(s) 1110 to recover the one or more the data streams destined for that UE 1110. On the uplink, each UE 1110 may transmit one or more spatially precoded data streams, which enables the node B 1108 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 12:
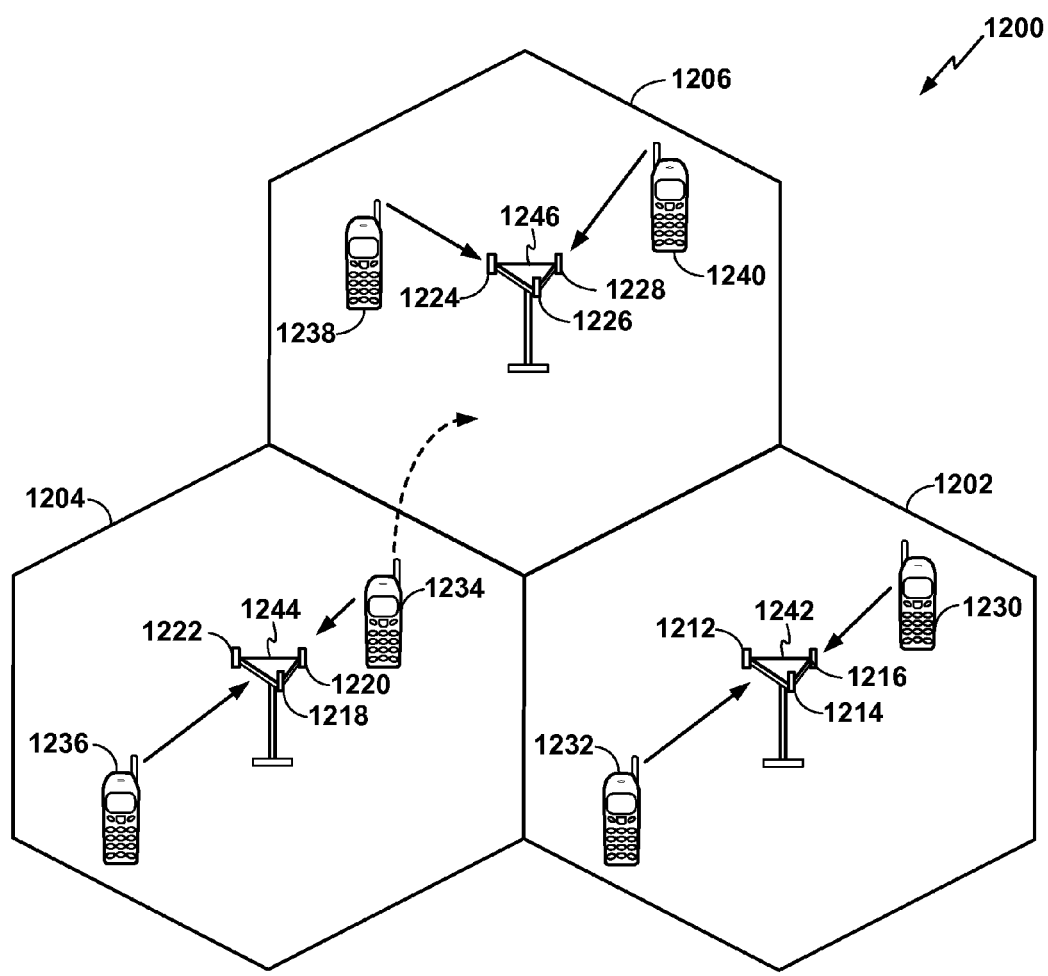
FIG. 12 is a conceptual diagram illustrating an example of an access network.

Referring to FIG. 12, an access network 1200 in a UTRAN architecture is illustrated. The multiple access wireless communication system includes multiple cellular regions (cells), including cells 1202, 1204, and 1206, each of which may include one or more sectors. The multiple sectors can be formed by groups of antennas with each antenna responsible for communication with UEs in a portion of the cell. For example, in cell 1202, antenna groups 1212, 1214, and 1216 may each correspond to a different sector. In cell 1204, antenna groups 1218, 1220, and 1222 each correspond to a different sector. In cell 1206, antenna groups 1224, 1226, and 1228 each correspond to a different sector. The cells 1202, 1204 and 1206 may include several wireless communication devices, e.g., User Equipment or UEs, which may be in communication with one or more sectors of each cell 1202, 1204 or 1206. For example, UEs 1230 and 1232 may be in communication with NodeB 1242, UEs 1234 and 1236 may be in communication with NodeB 1244, and UEs 1238 and 1240 can be in communication with NodeB 1246. Here, each NodeB 1242, 1244, 1246 is configured to provide an access point to a CN 1104 (FIG. 11) for all the UEs 1230, 1232, 1234, 1236, 1238, 1240 in the respective cells 1202, 1204, and 1206. Additionally, each NodeB 1242, 1244, 1246 may represent wireless node 104 (FIGS. 1 and 2) and UEs 1230, 1232, 1234, 1236, 1238, 1240 may represent UE 102 (FIG. 1) and may perform the methods outlined herein.

As the UE 1234 moves from the illustrated location in cell 1204 into cell 1206, a serving cell change (SCC) or handover may occur in which communication with the UE 1234 transitions from the cell 1204, which may be referred to as the source cell, to cell 1206, which may be referred to as the target cell. Management of the handover procedure may take place at the UE 1234, at the Node Bs corresponding to the respective cells, at a radio network controller 1106 (FIG. 11), or at another suitable node in the wireless network. For example, during a call with the source cell 1204, or at any other time, the UE 1234 may monitor various parameters of the source cell 1204 as well as various parameters of neighboring cells such as cells 1206 and 1202. Further, depending on the quality of these parameters, the UE 1234 may maintain communication with one or more of the neighboring cells. During this time, the UE 1234 may maintain an Active Set, that is, a list of cells that the UE 1234 is simultaneously connected to (i.e., the UTRA cells that are currently assigning a downlink dedicated physical channel DPCH or fractional downlink dedicated physical channel F-DPCH to the UE 1234 may constitute the Active Set).

The modulation and multiple access scheme employed by the access network 1200 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (WCDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 10, which is a conceptual diagram illustrating an example of the radio protocol architecture for the user and control planes.

Figure 13:
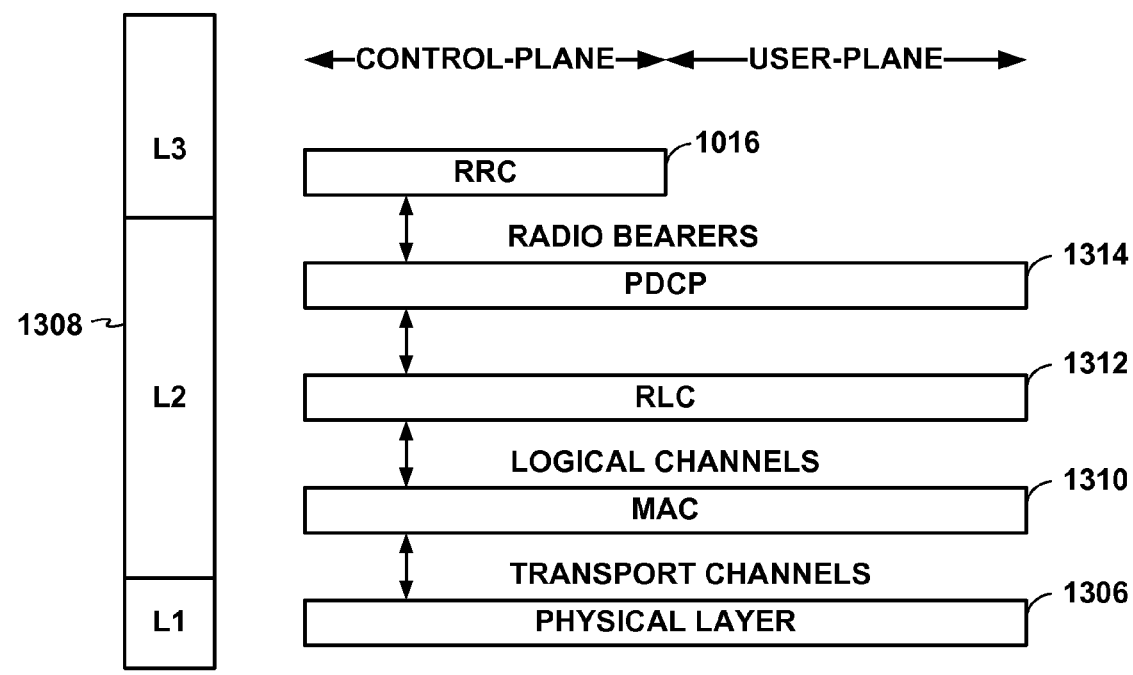
FIG. 13 is a conceptual diagram illustrating an example of a radio protocol architecture for the user and control plane.

Turning to FIG. 13, the radio protocol architecture for the UE and node B is shown with three layers: Layer 1, Layer 2, and Layer 3. Layer 1 is the lowest lower and implements various physical layer signal processing functions. Layer 1 will be referred to herein as the physical layer 1306. Layer 2 (L2 layer) 1308 is above the physical layer 1306 and is responsible for the link between the UE and node B over the physical layer 1306.

In the user plane, the L2 layer 1308 includes a media access control (MAC) sublayer 1310, a radio link control (RLC) sublayer 1312, and a packet data convergence protocol (PDCP) 1314 sublayer, which are terminated at the node B on the network side. Although not shown, the UE may have several upper layers above the L2 layer 1308 including a network layer (e.g., IP layer) that is terminated at a PDN gateway on the network side, and an application layer that is terminated at the other end of the connection (e.g., far end UE, server, etc.).

The PDCP sublayer 1314 provides multiplexing between different radio bearers and logical channels. The PDCP sublayer 1314 also provides header compression for upper layer data packets to reduce radio transmission overhead, security by ciphering the data packets, and handover support for UEs between NodeBs. The RLC sublayer 1312 provides segmentation and reassembly of upper layer data packets, retransmission of lost data packets, and reordering of data packets to compensate for out-of-order reception due to hybrid automatic repeat request (HARQ). The MAC sublayer 1310 provides multiplexing between logical and data channels. The MAC sublayer 1310 is also responsible for allocating the various radio resources (e.g., resource blocks) in one cell among the UEs. The MAC sublayer 1310 is also responsible for HARQ operations.

Figure 14:
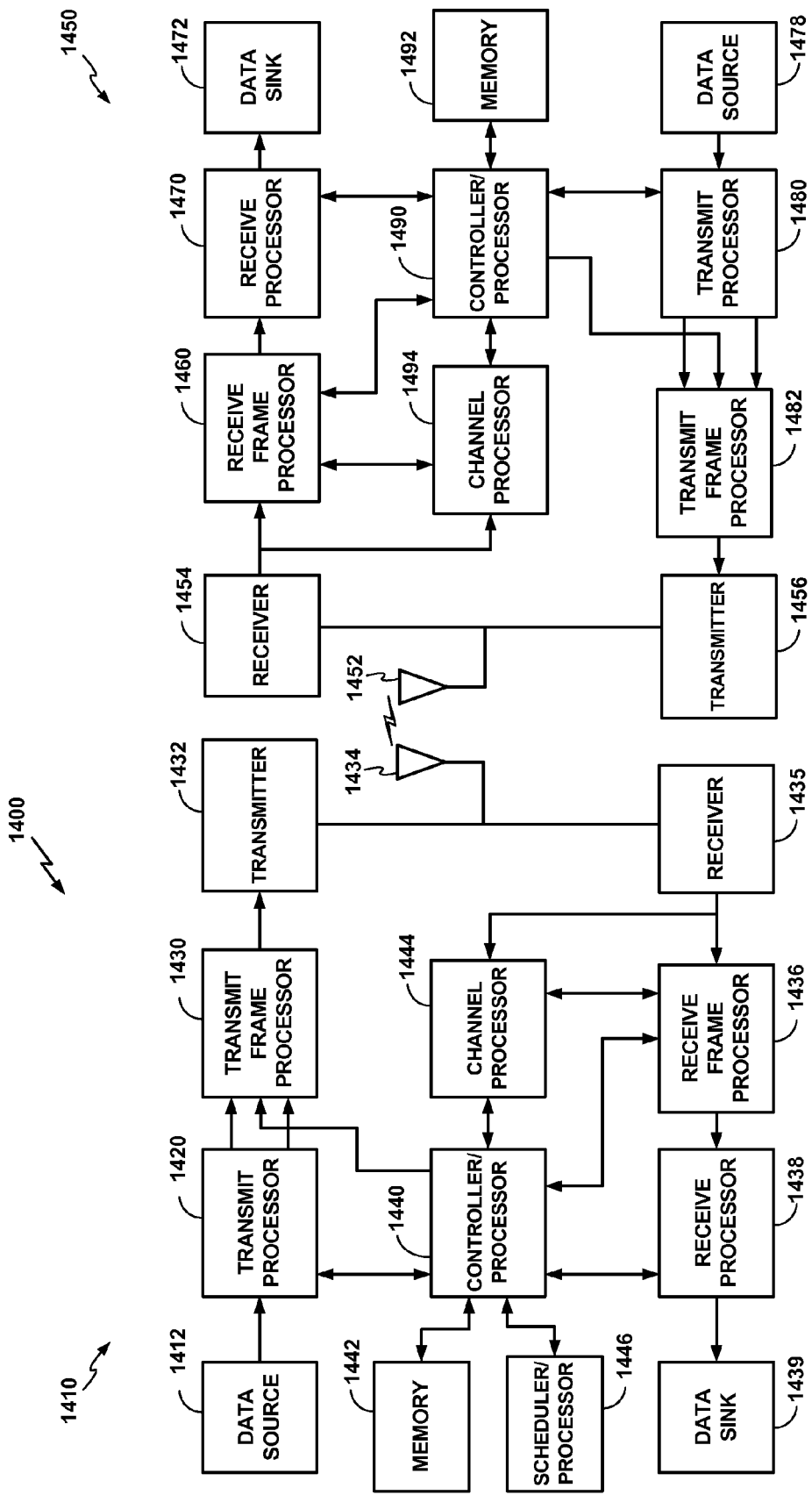
FIG. 14 is a block diagram conceptually illustrating an example of a NodeB in communication with a UE in a telecommunications system.

FIG. 14 is a block diagram of a NodeB 1410 in communication with a UE 1450, where the NodeB 1410 may be the NodeB 1108 in FIG. 11 and/or wireless node 104 (FIGS. 1 and 2), and the UE 1450 may be UE 102 (FIGS. 1 and 7). In the downlink communication, a transmit processor 1420 may receive data from a data source 1412 and control signals from a controller/processor 1440. The transmit processor 1420 provides various signal processing functions for the data and control signals, as well as reference signals (e.g., pilot signals). For example, the transmit processor 1420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1444 may be used by a controller/processor 1440 to determine the coding, modulation, spreading, and/or scrambling schemes for the transmit processor 1420. These channel estimates may be derived from a reference signal transmitted by the UE 1450 or from feedback from the UE 1450. The symbols generated by the transmit processor 1420 are provided to a transmit frame processor 1430 to create a frame structure. The transmit frame processor 1430 creates this frame structure by multiplexing the symbols with information from the controller/processor 1440, resulting in a series of frames. The frames are then provided to a transmitter 1432, which provides various signal conditioning functions including amplifying, filtering, and modulating the frames onto a carrier for downlink transmission over the wireless medium through antenna 1434. The antenna 1434 may include one or more antennas, for example, including beam steering bidirectional adaptive antenna arrays or other similar beam technologies.

At the UE 1450, a receiver 1454 receives the downlink transmission through an antenna 1452 and processes the transmission to recover the information modulated onto the carrier. The information recovered by the receiver 1454 is provided to a receive frame processor 1460, which parses each frame, and provides information from the frames to a channel processor 1494 and the data, control, and reference signals to a receive processor 1470. The receive processor 1470 then performs the inverse of the processing performed by the transmit processor 1420 in the NodeB 1410. More specifically, the receive processor 1470 descrambles and despreads the symbols, and then determines the most likely signal constellation points transmitted by the NodeB 1410 based on the modulation scheme. These soft decisions may be based on channel estimates computed by the channel processor 1494. The soft decisions are then decoded and deinterleaved to recover the data, control, and reference signals. The CRC codes are then checked to determine whether the frames were successfully decoded. The data carried by the successfully decoded frames will then be provided to a data sink 1472, which represents applications running in the UE 1450 and/or various user interfaces (e.g., display). Control signals carried by successfully decoded frames will be provided to a controller/processor 1490. When frames are unsuccessfully decoded by the receiver processor 1470, the controller/processor 1490 may also use an acknowledgement (ACK) and/or negative acknowledgement (NACK) protocol to support retransmission requests for those frames.

In the uplink, data from a data source 1478 and control signals from the controller/processor 1490 are provided to a transmit processor 1480. The data source 1478 may represent applications running in the UE 1450 and various user interfaces (e.g., keyboard). Similar to the functionality described in connection with the downlink transmission by the NodeB 1410, the transmit processor 1480 provides various signal processing functions including CRC codes, coding and interleaving to facilitate FEC, mapping to signal constellations, spreading with OVSFs, and scrambling to produce a series of symbols. Channel estimates, derived by the channel processor 1494 from a reference signal transmitted by the NodeB 1410 or from feedback contained in the midamble transmitted by the NodeB 1410, may be used to select the appropriate coding, modulation, spreading, and/or scrambling schemes. The symbols produced by the transmit processor 1480 will be provided to a transmit frame processor 1482 to create a frame structure. The transmit frame processor 1482 creates this frame structure by multiplexing the symbols with information from the controller/processor 1490, resulting in a series of frames. The frames are then provided to a transmitter 1456, which provides various signal conditioning functions including amplification, filtering, and modulating the frames onto a carrier for uplink transmission over the wireless medium through the antenna 1452.

The uplink transmission is processed at the NodeB 1410 in a manner similar to that described in connection with the receiver function at the UE 1450. A receiver 1435 receives the uplink transmission through the antenna 1434 and processes the transmission to recover the information modulated onto the carrier. The information recovered by the receiver 1435 is provided to a receive frame processor 1436, which parses each frame, and provides information from the frames to the channel processor 1444 and the data, control, and reference signals to a receive processor 1438. The receive processor 1438 performs the inverse of the processing performed by the transmit processor 1480 in the UE 1450. The data and control signals carried by the successfully decoded frames may then be provided to a data sink 1439 and the controller/processor, respectively. If some of the frames were unsuccessfully decoded by the receive processor, the controller/processor 1440 may also use an acknowledgement (ACK) and/or negative acknowledgement (NACK) protocol to support retransmission requests for those frames.

The controller/processors 1440 and 1490 may be used to direct the operation at the NodeB 1410 and the UE 1450, respectively. For example, the controller/processors 1440 and 1490 may provide various functions including timing, peripheral interfaces, voltage regulation, power management, and other control functions. The computer readable media of memories 1442 and 1492 may store data and software for the NodeB 1410 and the UE 1450, respectively. A scheduler/processor 1446 at the NodeB 1410 may be used to allocate resources to the UEs and schedule downlink and/or uplink transmissions for the UEs.

Several aspects of a telecommunications system have been presented with reference to a WCDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium. The computer-readable storage medium may be a non-transitory computer-readable storage medium. A non-transitory computer-readable storage medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable storage medium may also include, by way of example, a carrier wave, a transmission line, and any other suitable medium for transmitting software and/or instructions that may be accessed and read by a computer. The computer-readable storage medium may be resident in the processing system, external to the processing system, or distributed across multiple entities including the processing system. The computer-readable storage medium may be embodied in a computer-program product. By way of example, a computer-program product may include a computer-readable storage medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of advertising beacon transmission by a wireless node, comprising:
   determining that a resource availability opportunity exists for supporting a user equipment (UE) at the wireless node;
   determining that a last tune away time period since a last tune away to a non-serving channel exceeds a tune away threshold, wherein the non-serving channel is different from a serving channel of the wireless node;
   tuning to the non-serving channel based on determining that the resource availability opportunity exists and that the last tune away time period exceeds the tune away threshold; and
   transmitting an advertising beacon on the non-serving channel.

2. The method of claim 1, wherein determining a resource availability opportunity comprises determining that a traffic demand associated with the wireless node is less than a traffic demand threshold.

3. The method of claim 1, wherein determining a resource availability opportunity comprises determining that the non-serving channel is used by a neighboring wireless node based on information obtained from a UE report.

4. The method of claim 1, wherein determining a resource availability opportunity comprises determining that an available backhaul amount associated with a wireless node backhaul link is greater than or equal to an available backhaul threshold.

5. The method of claim 1, wherein determining a resource availability opportunity comprises determining that a channel load associated with the serving channel is less than or equal to a channel load threshold.

6. The method of claim 1, wherein transmitting the advertising beacon further comprises transmitting the advertising beacon for a transmit time period such that the advertising beacon is received by the UE during at least one UE awake period where the wireless node does not possess stored information related to a wakeup schedule of the UE.

7. The method of claim 1, wherein transmitting the advertising beacon further comprises periodically transmitting the advertising beacon at a transmit time frequency such that the advertising beacon is received by the UE during at least one UE awake period where the wireless node does not possess stored information related to a wakeup schedule of the UE.

8. The method of claim 1, wherein transmitting the advertising beacon further comprises transmitting the advertising beacon during a UE awake period where the wireless node possesses stored information related to a wakeup schedule of the UE.

9. The method of claim 8, wherein the stored information related to the wakeup schedule of the UE is based on a beacon transmission schedule of a neighboring wireless node on the non-serving channel.

10. The method of claim 1, wherein the advertising beacon comprises information related to the wireless node, wherein the information comprises one or more of a service set identifier (SSID), a serving channel frequency, and a serving channel number.

11. A method of advertising beacon processing by a user equipment (UE) served by a wireless node on a serving channel, comprising:
    receiving, on a non-serving channel different from the serving channel, an advertising beacon from a neighboring wireless node at a signal strength associated with the non-serving channel, wherein the advertising beacon is transmitted by the neighboring wireless node if a last tune away time period since a last tune away by the neighboring wireless node to the non-serving channel exceeds a tune away threshold;
    determining that the signal strength associated with the non-serving channel is greater than a signal strength associated with the serving channel by at least a threshold value; and
    scanning the non-serving channel.

12. The method of claim 11, further comprising:
    providing a wakeup schedule for the UE, and wherein the advertising beacon is received during a UE awake period.

13. The method of claim 12, wherein the providing further comprises:
    receiving a message from the wireless node prompting the UE to tune to the non-serving channel;
    listening to beacon transmission from the neighboring wireless node to determine a beacon transmission time schedule of the neighboring wireless node; and reporting the beacon transmission time schedule of the neighboring wireless node to the wireless node.

14. An apparatus, comprising:
means for determining that a resource availability opportunity exists for supporting a user equipment (UE) at a wireless node;
means for determining that a last tune away time period since a last tune away to a non-serving channel exceeds a tune away threshold, wherein the non-serving channel is different from a serving channel of the wireless node;
means for tuning to the non-serving channel based on determining that the resource availability opportunity exists and that the last tune away time period exceeds the tune away threshold; and
means for transmitting an advertising beacon on the non-serving channel.

15. The apparatus of claim 14, wherein the means for determining a resource availability opportunity comprises means for determining that a traffic demand associated with the wireless node is less than a traffic demand threshold.

16. The apparatus of claim 14, wherein the means for determining a resource availability opportunity comprises means for determining that the non-serving channel is used by a neighboring wireless node based on information obtained from a UE report.

17. The apparatus of claim 14, wherein the means for determining a resource availability opportunity comprises means for determining that an available backhaul amount associated with a wireless node backhaul link is greater than or equal to an available backhaul threshold.

18. The apparatus of claim 14, wherein the means for determining a resource availability opportunity comprises means for determining that a channel load associated with the serving channel is less than or equal to a channel load threshold.

19. The apparatus of claim 14, wherein the means for transmitting the advertising beacon further comprises means for transmitting the advertising beacon for a transmit time period such that the advertising beacon is received by the UE during at least one UE awake period where the wireless node does not possess stored information related to a wakeup schedule of the UE.

20. The apparatus of claim 14, wherein the means for transmitting the advertising beacon further comprises means for periodically transmitting the advertising beacon at a transmit time frequency such that the advertising beacon is received by the UE during at least one UE awake period where the wireless node does not possess stored information related to a wakeup schedule of the UE.

21. The apparatus of claim 14, wherein the means for transmitting the advertising beacon further comprises means for transmitting the advertising beacon during a UE awake period where the wireless node possesses stored information related to a wakeup schedule of the UE.

22. The apparatus of claim 21, wherein the stored information related to the wakeup schedule of the UE is based on a beacon transmission schedule of a neighboring wireless node on the non-serving channel.

23. The apparatus of claim 14, wherein the advertising beacon comprises information related to the wireless node, wherein the information comprises one or more of a service set identifier (SSID), a serving channel frequency, and a serving channel number.

24. A user equipment (UE), comprising:
means for receiving, on a non-serving channel different from a serving channel over which the UE is served by a wireless node, an advertising beacon from a neighboring wireless node at a signal strength associated with the non-serving channel, wherein the advertising beacon is transmitted by the neighboring wireless node if a last tune away time period since a last tune away by the neighboring wireless node to the non-serving channel exceeds a tune away threshold;
means for determining that the signal strength associated with the non-serving channel is greater than a signal strength associated with the serving channel by at least a threshold value; and
means for scanning the non-serving channel.

25. The UE of claim 24, further comprising:
means for providing a wakeup schedule for the UE, and wherein the advertising beacon is received during a UE awake period.

26. The UE of claim 25, wherein the means for providing further comprises:
means for receiving a message from the wireless node prompting to tune to the non-serving channel;
means for listening to beacon transmission from the neighboring wireless node to determine a beacon transmission time schedule of the neighboring wireless node; and
means for reporting the beacon transmission time schedule of the neighboring wireless node to the serving wireless node.

27. A non-transitory computer-readable medium storing computer executable comprising:
code for determining that a resource availability opportunity exists for supporting a user equipment (UE) at a wireless node;
code for determining that a last tune away time period since a last tune away to a non-serving channel exceeds a tune away threshold, wherein the non-serving channel is different from a serving channel of the wireless node;
code for tuning to the non-serving channel based on determining that the resource availability opportunity exists and that the last tune away time period exceeds the tune away threshold; and
code for transmitting an advertising beacon on the non-serving channel.

28. The computer-readable medium of claim 27, wherein the code for determining a resource availability opportunity comprises code for determining that a traffic demand associated with the wireless node is less than a traffic demand threshold.

29. The computer-readable medium of claim 27, wherein the code for determining a resource availability opportunity comprises code for determining that the non-serving channel is used by a neighboring wireless node based on information obtained from a UE report.

30. The computer-readable medium of claim 27, wherein the code for determining a resource availability opportunity comprises code for determining that an available backhaul amount associated with a wireless node backhaul link is greater than or equal to an available backhaul threshold.

31. The computer-readable medium of claim 27, wherein the code for determining a resource availability opportunity comprises code for determining that a channel load associated with the serving channel is less than or equal to a channel load threshold.

32. The computer-readable medium of claim 27, wherein the code for transmitting the advertising beacon further comprises code for transmitting the advertising beacon for a transmit time period such that the advertising beacon is received by the UE during at least one UE awake period where the wireless node does not possess stored information related to a wakeup schedule of the UE.

33. The computer-readable medium of claim 27, wherein the code for transmitting the advertising beacon further comprises code for periodically transmitting the advertising beacon at a transmit time frequency such that the advertising beacon is received by the UE during at least one UE awake period where the wireless node does not possess stored information related to a wakeup schedule of the UE.

34. The computer-readable medium of claim 27, wherein the code for transmitting the advertising beacon further comprises code for transmitting the advertising beacon during a UE awake period where the wireless node possesses stored information related to a wakeup schedule of the UE.

35. The computer-readable medium of claim 34, wherein the stored information related to the wakeup schedule of the UE is based on a beacon transmission schedule of a neighboring wireless node on the non-serving channel.

36. The computer-readable medium of claim 27, wherein the advertising beacon comprises information related to the wireless node, wherein the information comprises one or more of a service set identifier (SSID), a serving channel frequency, and a serving channel number.

37. A non-transitory computer-readable medium storing computer executable comprising:
 code for receiving, on a non-serving channel different from a serving channel over which a user equipment (UE) is served by a wireless node, an advertising beacon from a neighbor wireless node at a signal strength associated with the non-serving channel, wherein the advertising beacon is transmitted by the neighboring wireless node if a last tune away time period since a last tune away by the neighboring wireless node to the non-serving channel exceeds a tune away threshold;
 code for determining that the signal strength associated with the non-serving channel is greater than a signal strength associated with the serving channel by at least a threshold value; and
 code for scanning the non-serving channel.

38. The computer-readable medium of claim 37, further comprising code for providing a wakeup schedule for the UE, and wherein the advertising beacon is received during a UE awake period.

39. The computer-readable medium of claim 38, wherein the code for providing the advertising beacon further comprises:
 code for receiving a message from the wireless node prompting the UE to tune to the non-serving channel;
 code for listening to beacon transmission from the neighboring wireless node to determine a beacon transmission time schedule of the neighboring wireless node; and
 code for reporting the beacon transmission time schedule of the neighboring wireless node to the wireless node.

40. An apparatus for advertising beacon transmission, comprising;
 at least one processor; and
 a memory coupled to the at least one processor, wherein the at least one processor is configured to:
  determine that a resource availability opportunity exists for supporting a user equipment (UE) at a wireless node;
  determine that a last tune away time period since a last tune away to a non-serving channel exceeds a tune away threshold, wherein the non-serving channel is different from a serving channel of the wireless node;
  tune to the non-serving channel based on determining that the resource availability opportunity exists and that the last tune away time period exceeds the tune away threshold; and
  transmit an advertising beacon on the non-serving channel.

41. The apparatus of claim 40, wherein the at last one processor configured to determine a resource availability opportunity is further configured to determine that a traffic demand associated with the wireless node is less than a traffic demand threshold.

42. The apparatus of claim 40, wherein the at least one processor configured to determine a resource availability opportunity is further configured to determine that the non serving channel is used by a neighboring wireless node based on information obtained from a UE report.

43. The apparatus of claim 40, wherein the at least one processor configured to determine a resource availability opportunity is further configured to determine that an available backhaul amount associated with a wireless node backhaul link is greater than or equal to an available backhaul threshold.

44. The apparatus of claim 40, wherein the at least one processor configured to determine a resource availability opportunity is further configured to determine that a channel load associated with the serving channel is less than or equal to a channel load threshold.

45. The apparatus of claim 40, wherein the at least one processor configured to transmit the advertising beacon further is further configured to transmit the advertising beacon for a transmit time period such that the advertising beacon is received by the UE during at least one UE awake period where the wireless node does not possess stored information related to a wakeup schedule of the UE.

46. The apparatus of claim 40, wherein the at least one processor configured to transmit the advertising beacon is further configured to periodically transmit the advertising beacon at a transmit time frequency such that the advertising beacon is received by the UE during at least one UE awake period where the wireless node does not possess stored information related to a wakeup schedule of the UE.

47. The apparatus of claim 40, wherein the at least one processor configured to transmit the advertising beacon is further configured to transmit the advertising beacon during a UE awake period where the wireless node possesses stored information related to a wakeup schedule of the UE.

48. The apparatus of claim 47, wherein the stored information related to the wakeup schedule of the UE is based on a beacon transmission schedule of a neighboring wireless node on the non-serving channel.

49. The apparatus of claim 40, wherein the advertising beacon comprises information related to the wireless node, wherein the information comprises one or more of a service set identifier (SSID), a serving channel frequency, and a serving channel number.

50. A user equipment (UE), comprising:
 at least one processor; and
 a memory coupled to the at least one processor, wherein the at least one processor is configured to:
  receive, on a non-serving channel different from a serving channel over which the UE is served by a wireless node, an advertising beacon from a neighboring wireless node at a signal strength associated with the non-serving channel, wherein the advertising beacon is transmitted by the neighboring wireless node if a last tune away time period since a last tune away by the neighboring wireless node to the non-serving channel exceeds a tune away threshold;

determine that the signal strength associated with the non-serving channel is greater than a signal strength associated with the serving channel by at least a threshold value; and scan the non-serving channel.

51. The UE of claim 50, wherein the at least one processor is configured to provide a wakeup schedule for UE, and wherein the advertising beacon is received during a UE awake period.

52. The UE of claim 51, wherein the at least one processor is configured to:

receive a message from the wireless node prompting the UE to tune to the non-serving channel;

listen to a beacon transmission from the neighboring wireless node to determine a beacon transmission time schedule of the neighboring wireless node; and report the beacon transmission time schedule of the neighboring wireless node to the serving wireless node.

\* \* \* \* \*